(12) United States Patent
Saito et al.

(10) Patent No.: US 8,199,375 B2
(45) Date of Patent: Jun. 12, 2012

(54) IMAGE FORMING SYSTEM AND IMAGE READING APPARATUS

(75) Inventors: Yasuhiro Saito, Toride (JP); Toshiro Tomono, Toride (JP); Toshihiko Kitahara, Tokyo (JP); Akihiro Sato, Kashiwa (JP); Rie Aizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 12/476,705

(22) Filed: Jun. 2, 2009

(65) Prior Publication Data

US 2009/0303552 A1    Dec. 10, 2009

(30) Foreign Application Priority Data

Jun. 6, 2008 (JP) .................................. 2008-149536
Mar. 26, 2009 (JP) .................................. 2009-077022

(51) Int. Cl.
*H04N 1/04* (2006.01)
(52) U.S. Cl. ......... 358/474; 358/496; 358/497; 358/498
(58) Field of Classification Search .................. 358/474, 358/496, 497, 498
See application file for complete search history.

(56) References Cited

U.S. PATENT DOCUMENTS

| | | | | |
|---|---|---|---|---|
| 3,905,697 A | * | 9/1975 | Komori et al. ................. 355/26 |
| 4,279,504 A | * | 7/1981 | Brown et al. .................. 355/72 |
| 5,173,785 A | * | 12/1992 | Muramatsu ................. 358/400 |
| 5,377,966 A | * | 1/1995 | Ohmori ........................ 271/4.01 |
| 6,647,243 B2 | | 11/2003 | Sato et al. ..................... 399/407 |
| 6,725,011 B2 | | 4/2004 | Sato .............................. 399/405 |
| 6,873,822 B2 | | 3/2005 | Tomono et al. ............... 399/401 |
| 6,947,701 B2 | | 9/2005 | Uchida et al. ................. 399/401 |
| 7,050,752 B2 | | 5/2006 | Sato et al. ..................... 399/405 |
| 7,120,383 B2 | | 10/2006 | Sato et al. ..................... 399/407 |

FOREIGN PATENT DOCUMENTS

| | | | |
|---|---|---|---|
| JP | 2001-334722 | * | 4/2001 |
| JP | 2001-334722 | | 12/2001 |
| JP | 2004-98379 | | 4/2004 |
| JP | 2006-108796 | | 4/2006 |

* cited by examiner

*Primary Examiner* — Houshang Safaipour
(74) *Attorney, Agent, or Firm* — Fitzpatrick, Cella, Harper & Scinto

(57) ABSTRACT

An image forming system including: an image reading portion which reads an image of an original; an image forming portion which forms the image on a sheet based on image information read by the image reading portion; and a storing device which stores the original before the image is read, the original after the image is read, and the sheet on which the image has been formed based on the image information, wherein the storing device is detachable from the image forming system.

13 Claims, 16 Drawing Sheets

IMAGE FORMING SYSTEM AND IMAGE READING APPARATUS

BACKGROUND OF THE INVENTION

1. Field of the Invention

The present invention relates to an image forming system and an image reading apparatus.

2. Description of the Related Art

Conventionally, there is an image forming system such as a digital copying machine, a printer, or a facsimile, which includes an image reading portion for reading an original image, and an image forming portion for forming an image on a sheet based on image information read by the image reading portion.

In a case of forming an image on a sheet by the image forming system, an original conveying portion conveys an original to the image reading portion. After the image reading portion reads an original image, the image forming portion forms an image on the sheet based on the image information. Then, after forming the image on the sheet, the sheet is ejected to a sheet delivering portion.

When a user operates a copying machine as an example of the conventional image forming system so as to perform a copy process, the original is put on an original table or in an original feeding apparatus that constitutes the original conveying portion so that the copying operation (image forming operation) is started.

When an original is copied, a user may forget to take out the original before or after the copying operation, or a printed sheet that is a resultant. If the user leaves the original or the resultant, information leakage may happen particularly in the case where the left original or resultant is a confidential document that should not be read by another person.

Therefore, in order to prevent the information leakage caused by the left original or resultant, i.e., to secure concealment of the original or the resultant, some of the recent copying machines have an original storage portion for storing the original after reading images (see Japanese Patent Application Laid-Open No. 2006-108796). In addition, some of them have a concealing portion for concealing from a third party the resultant on which confidential information or the like is copied and which is delivered from the copying machine (see Japanese Patent Application Laid-Open No. 2004-98379). Japanese Patent Application Laid-Open No. 2001-334722 describes a structure including a confidential original paper feeding portion to which a confidential original is set, a confidential original delivering portion for delivering the confidential original from which images are read, and a confidential delivering portion for delivering sheets on which images about the confidential document are formed.

In the conventional technique described above, the security during the copying operation is secured, but confidentiality cannot be secured when the user takes the confidential document to the copying machine or takes the confidential document from the copying machine. In addition, a paper feed stacking portion and a delivery stacking portion for a confidential document should be attached to the copying machine though they are rarely used and occupy some space that is not normally necessary.

SUMMARY OF THE INVENTION

The present invention has been made in view of this present situation, and provides an image forming system which can secure concealment of a recorded sheet as an original and a resultant.

The image forming system according to the present invention comprises: an image reading portion which reads an image of an original; an image forming portion which forms the image on a sheet based on image information read by the image reading portion; and a storing device which stores the original before the image is read, the original after the image is read, and the sheet on which the image has been formed based on the image information, wherein the storing device is detachable from the image forming system.

The image forming system according to the present invention can secure concealment of the original and the sheet on which the image is formed.

Further features of the present invention will become apparent from the following description of exemplary embodiments with reference to the attached drawings.

DESCRIPTION OF THE EMBODIMENTS

Hereinafter, embodiments of the present invention are described with reference to the attached drawings.

Figure 1:
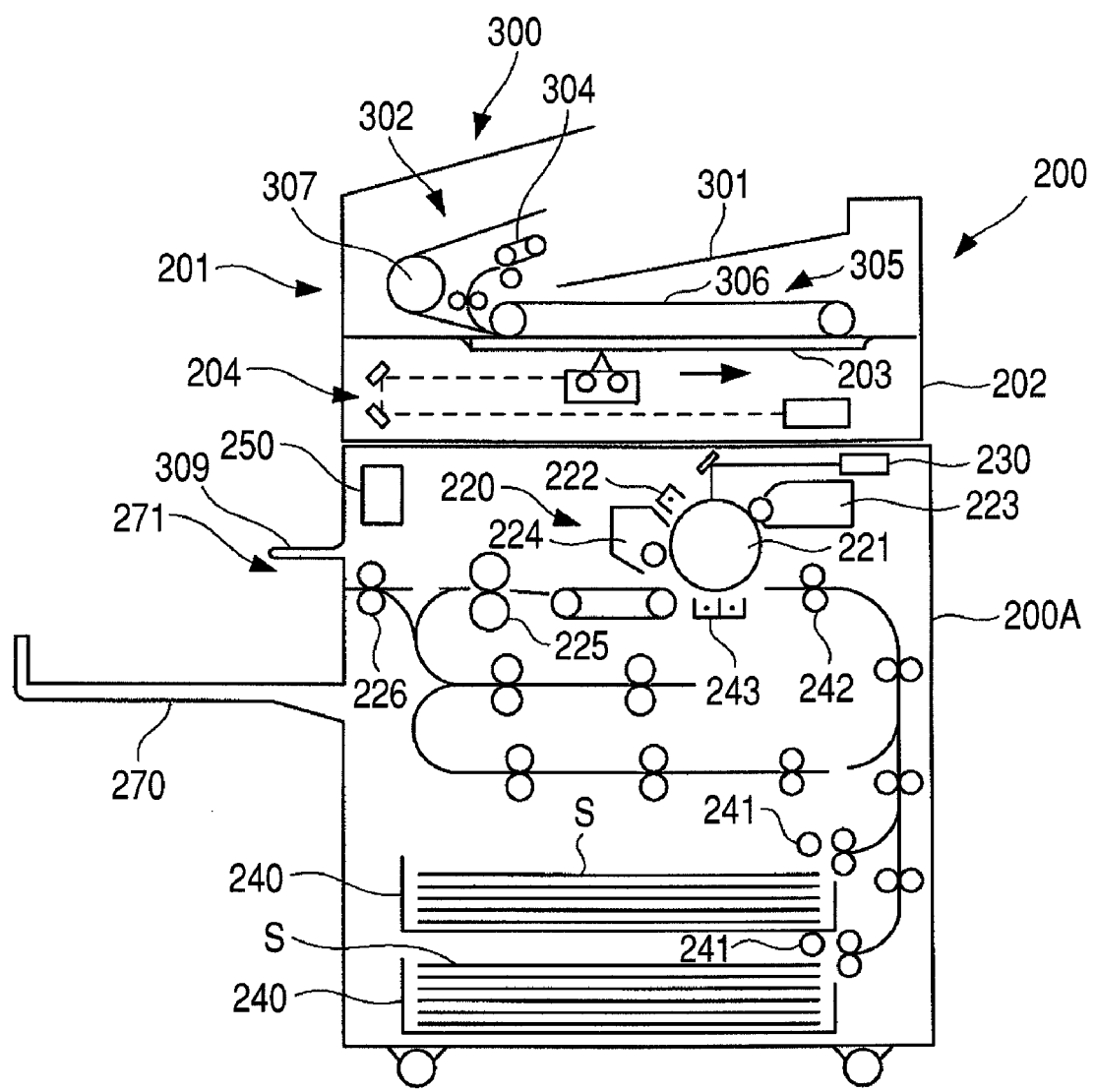
FIG. 1 illustrates a structure of a copying machine as an example of an image forming apparatus according to a first embodiment of the present invention.

FIG. 1 illustrates a structure of a copying machine as an example of an image forming apparatus according to a first embodiment of the present invention.

In FIG. 1, a copying machine 200 is an image forming system. An image reading apparatus 201 is disposed on an upper surface of a copying machine main body 200A. An image forming portion 220 is disposed inside the copying machine main body 200A. A control portion 250 controls a copying operation and the like of the copying machine main body 200A as an image forming apparatus main body.

The image reading apparatus 201 includes a scanner portion 202 as an original reading portion for reading original images, and an original feeding apparatus 300 that is an original conveying portion for conveying an original to the scanner portion 202 and is disposed on an upper surface of the scanner portion 202 in a pivotable manner for opening and closing in a vertical direction.

The scanner portion 202 includes a platen glass plate 203 that is a table on which a sheet is placed and is disposed on the upper surface of the scanner portion 202, and an image reading portion 204 for scanning and reading images of the original on the platen glass plate 203.

The original feeding apparatus 300 forms a sheet pressing portion for exerting a downward pressure on the original placed on the platen glass plate 203 and is attached in an openable and closable manner to an end of the scanner portion 202 which is parallel to the sheet conveying direction. When an original is placed on the platen glass plate 203, the original feeding apparatus 300 is opened, and then the original is placed on the platen glass plate 203 at a predetermined image reading position.

The original feeding apparatus 300 includes an original tray 301 in which the original is placed, and a feeding portion 302 for feeding the original. The feeding portion 302 picks out the uppermost sheet of the original stacked in the original tray 301 with image-formed sides up one by one and feeds the original to one end side (left side in the drawing) of the platen glass plate 203.

The feeding portion 302 has an original feeding portion 304 for feeding the original placed in the original tray 301, and an original conveying portion 305 for conveying the original onto the platen glass plate 203. The original conveying portion 305 is provided with a conveyor belt 306 so as to cover the upper surface of the platen glass plate 203.

The feeding portion 302 is provided with a delivery roller 307 for delivering the original after image reading to the original tray 301. The delivery roller 307 receives the original carried by the conveyor belt 306 from the left end side of the platen glass plate 203 and delivers the original to the original tray 301.

Next, an operation of the image reading apparatus 201, for example, an operation of reading images of an original conveyed by the original feeding apparatus 300 onto the platen glass plate is described.

The original feeding apparatus 300 conveys the original placed in the original tray 301 by the feeding portion 302 onto the platen glass plate 203 of the scanner portion 202. After that, the original is conveyed by the conveyor belt 306. The original is conveyed by the conveyor belt 306 onto the platen glass plate 203 at a predetermined image reading position, and is stopped at the image reading position.

After the original is stopped at the image reading position, the image reading portion 204 of the scanner portion 202 is moved in the arrow direction, and the original image is read. Information of the image read by the image reading portion 204 is stored as image information in an internal memory 252 illustrated in FIG. 5.

After the image is read by the scanner portion 202, for example, the original of the read image is delivered onto the original tray 301. In this case, the conveyor belt 306 is reversed, and the original from which the image is read is conveyed to the delivery roller 307. After that, the original from which the image is read is delivered by the delivery roller 307 to the original tray 301.

The image forming portion 220 includes an exposure portion 230, a cylindrical photosensitive drum 221, a charger 222, a developing device 223, and a cleaning device 224. On the downstream side of the image forming portion 220, there is provided a sheet delivering portion 271 or the like which includes a fixing device 225, a delivery roller 226, and a delivery tray 270.

When the image forming portion 220 forms an image on a sheet, the exposure portion 230 projects light onto the photosensitive drum 221 via a polygon mirror or the like (not shown) based on the image information that has been read by the image reading apparatus 201 and stored in the internal memory.

In this case, the surface of the photosensitive drum 221 has been charged uniformly by the charger 222, and an electrostatic latent image is formed on the surface of the photosensitive drum when the light is projected. The electrostatic latent image is developed by the developing device 223, whereby a toner image is formed on the surface of the photosensitive drum.

In parallel with the operation of forming the toner image, a sheet S set in a cassette 240 is conveyed by a sheet feed roller 241 to a registration roller 242. Next, the sheet S is conveyed by the registration roller 242 to a transferring portion formed of the photosensitive drum 221 and a transferring charger 243 at the timing when the leading edge of the sheet meets the leading edge of the toner image on the photosensitive drum 221. When the sheet S passes through the transferring portion, a transferring bias is applied to the transferring charger 243, whereby toner image on the photosensitive drum is transferred onto the sheet S.

The sheet S to which the toner image is transferred is conveyed to the fixing device 225, and the toner image is heated and fixed when the sheet S passes through the fixing device 225. The fixed sheet S is delivered by the delivery roller 226 of the sheet delivering portion 271 to the delivery tray 270.

In this embodiment, there is a case of copying an original to be concealed such as a confidential document that should not be read by another person. In this case, the original such as a confidential document is stored in a storage container 102 serving as a storing device illustrated in FIG. 2, and afterward the storage container 102 is set to the original feeding apparatus 300 as illustrated in FIG. 3.

The storage container 102 is made of, for example, an opaque material such as an ABS resin or polycarbonate so that contents thereof cannot be visually identified. Other materials such as a translucent material can be used for forming the storage container 102 as long as an original or a resultant stored in the storage container 102 cannot be visually identified.

The storage container 102 includes an original storing portion including an original storing cell 110 that is a first storing portion for storing the original D and a read original storing cell 104 that is a second storing portion for storing the original after the images are read (hereinafter referred to as read original) D1. In addition, the storage container 102 includes a resultant storing cell 122 that is a sheet storing portion for storing a resultant S1 which is sheet to which the original such as a confidential document is copied.

Figure 2:
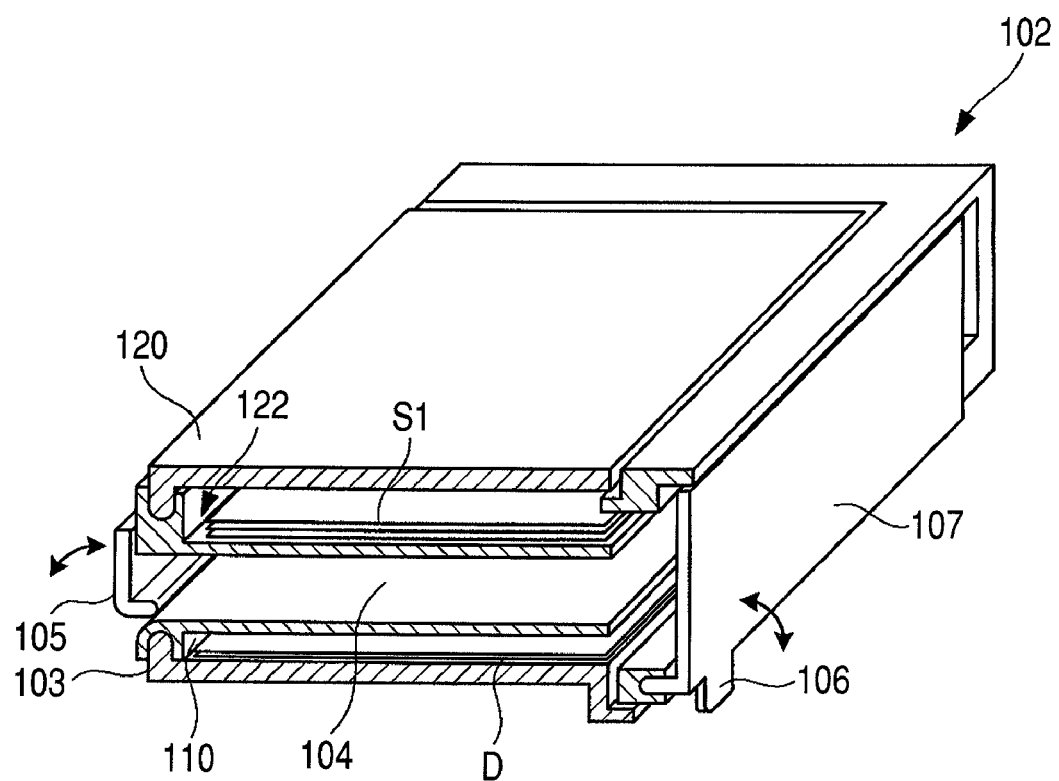
FIG. 2 is a perspective view of a storage container that is detachably attached to the copying machine.
Figure 3:
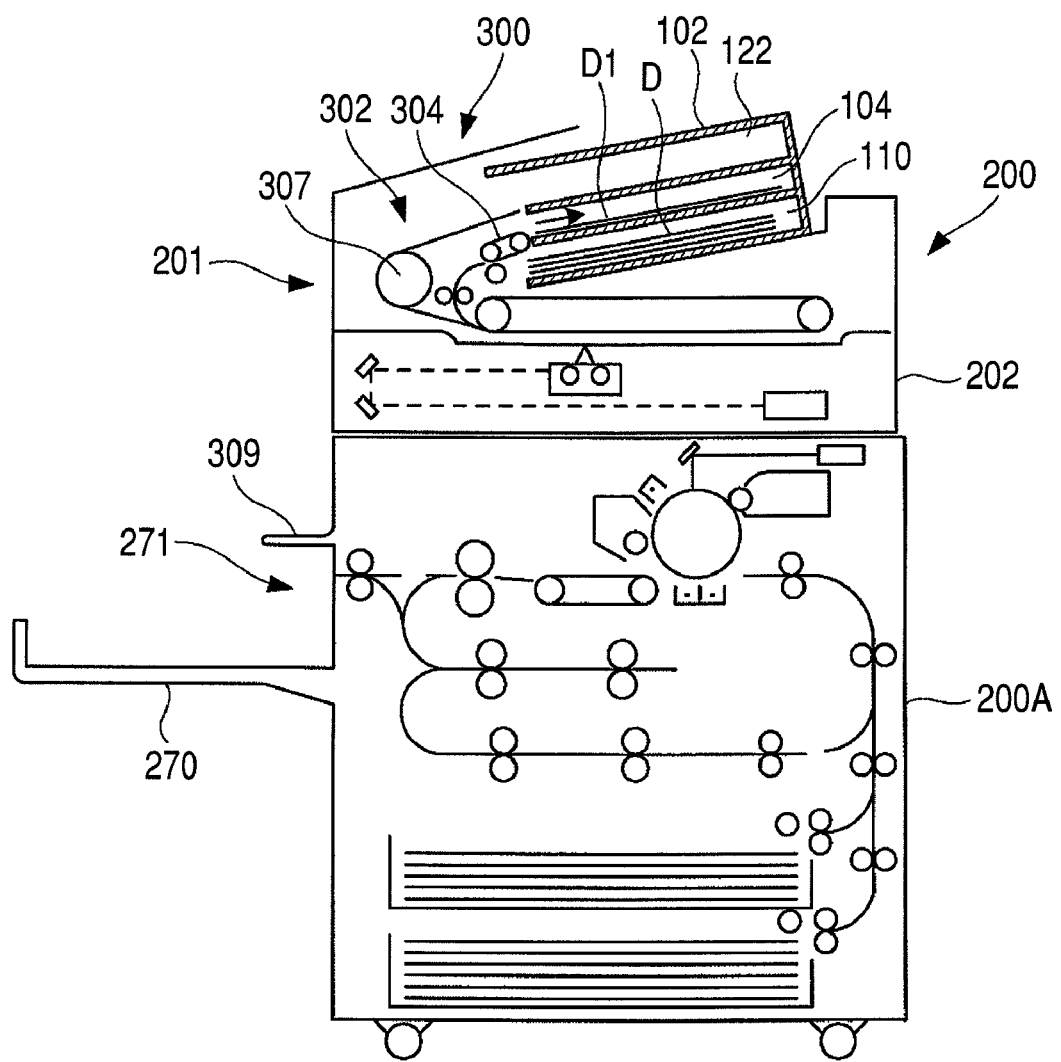
FIG. 3 illustrates a state in which the storage container is detachably attached to an original convey device of the copying machine.

In FIG. 2, a first lid 103 has an end rotatably supported by a storage container main body 102 so as to be provided to the storage container main body 102 in an openable and closable manner. When the original D is stored, the first lid 103 is opened so that the original D is stored in the original storing cell 110. A first shutter 105 has an end rotatably supported by the storage container main body 102 so as to be provided to the storage container main body 102 in an openable and closable manner. When a read original D1 stored in the read original storing cell 104 is taken out, the first shutter 105 is opened.

A second lid 120 has an end rotatably supported by the storage container main body 102 so as to be provided to the storage container main body 102a in an openable and closable manner. When a resultant S1 stored in the resultant storing cell 122 is taken out, the second lid 120 is opened and the resultant S1 is taken out.

A second shutter 107 has an end rotatably supported by the storage container main body 102 so as to be provided to the storage container main body 102 in an openable and closable manner. The second shutter 107 closes one side of the original storing cell 110, one side of the read original storing cell 104, and one side of the resultant storing cell 122. The second shutter 107 is closed by a spring (not shown) when the storage container 102 is carried. Since the second shutter 107 is closed, it is possible to prevent the original or the like from jumping out from the storage container 102 when storage container 102 is carried.

An engaging portion 106 protrudes from the lower end of the second shutter 107. When the storage container 102 is set to the original feeding apparatus 300 as illustrated in FIG. 3, the engaging portion 106 engages with a protruding portion (not shown) of the original feeding apparatus 300. When the engaging portion 106 engages with the protruding portion, the second shutter 107 rotates downward against the spring (not shown).

The second shutter 107 rotates downward, thereby, one side of the original storing cell 110, one side of the read original storing cell 104, and one side of the resultant storing cell 122 is opened. As a result, the original D can be delivered, and the read original D1 can be stored. When the storage container 102 is set to the original feeding apparatus 300, except the second shutter 107, the first shutter 105, the first lid 103 and the second lid 120 cannot be opened because of interference with the original feeding apparatus 300.

Figure 4:
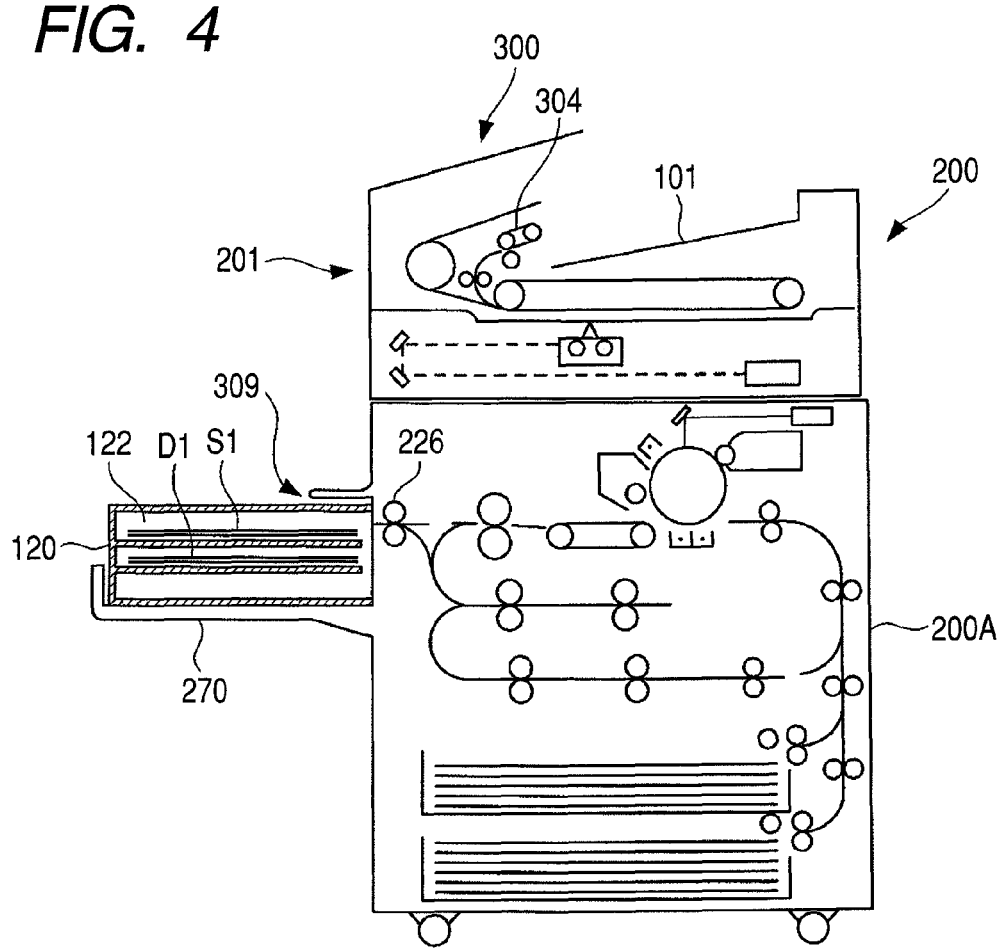
FIG. 4 illustrates a state in which the storage container is detachably attached to a resultant stacking portion of the copying machine.

After every sheet of the original D is read and the read original D1 is stored in the read original storing cell 104, the storage container 102 is removed from the original feeding apparatus 300. The storage container 102 is detachably attached (set) to a resultant stacking portion 309 that is provided to the sheet delivering portion 271 in the state of being placed on the delivery tray 270 as illustrated in FIG. 4.

For instance, a protruding portion (not shown) is provided also to the delivery tray 270. Also when the storage container 102 is set to the resultant stacking portion 309, the second shutter 107 of the storage container 102 is opened. As a result, the resultant S1 delivered from the delivery roller 226 is stored in the resultant storing cell 122 after images are formed.

Figure 5:
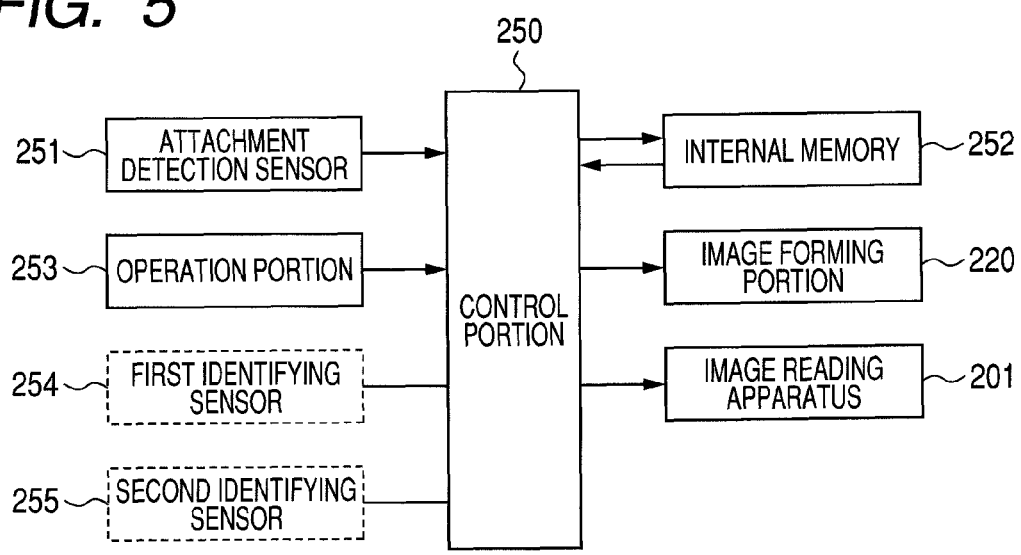
FIG. 5 is a control block diagram of the copying machine.

FIG. 5 is a control block diagram of the copying machine 200. As illustrated in FIG. 5, the control portion 250 is connected with an attachment detection sensor 251 for detecting that the storage container 102 is set to the resultant stacking portion 309. The control portion 250 reads the image information stored in the internal memory 252 in response to a detection signal from the attachment detection sensor 251 and controls the image forming portion 220 based on the image information so as to perform image formation. The control portion 250 is connected with an operation portion 253 including a copy button (not shown) and a display portion (not shown), and the image reading apparatus 201, and the like. The control portion 250 controls also an operation of the image reading apparatus 201.

Next, a copying operation of the copying machine 200, which is performed by using the storage container 102, is described.

First, the user opens the first lid 103 of the storage container 102, thereby storing the original D in the original storing cell 110. After that, the storage container 102 storing the original D is set to the original feeding apparatus 300 in an inclined state as illustrated in FIG. 3. On this occasion, the engaging portion 106 of the second shutter 107 of the storage container 102 engages with the protruding portion of the original feeding apparatus 300, whereby the second shutter 107 is opened. As a result, the feeding portion side of the original storing cell 110, the feeding portion side of the read original storing cell 104, and the feeding portion side of the resultant storing cell 122 is opened.

When the copy button is pressed in this state, the original D stored in the original storing cell 110 is fed by the feeding portion 302 of the original feeding apparatus 300 onto the platen glass plate 203, and thus the image reading portion 204 reads images of the original. After the images are read, the read original D1 is stored in the read original storing cell 104 of the storage container 102 by reversing of the conveyor belt 306 and by the delivery roller 307. Image information read sequentially from the original D is temporarily stored in the internal memory 252.

After every sheet of the original D is read, the storage container 102 is removed from the original feeding apparatus 300 and is detachably attached (set) to the resultant stacking portion 309 as illustrated in FIG. 4. When the storage container 102 is set, the engaging portion 106 of the second shutter 107 of the storage container 102 engages with the protruding portion (not shown) of the resultant stacking portion 309, whereby the second shutter 107 is opened. As a result, the delivery roller side of the original storing cell 110, the delivery roller side of the read original storing cell 104, and the delivery roller side of the resultant storing cell 122 is opened.

The copying machine main body 200 is provided with the attachment detection sensor 251 (see FIG. 5) as a detection portion for detecting that the storage container 102 is attached. When the control portion 250 receives from the attachment detection sensor 251 the detection signal indicating that the storage container 102 is set to the resultant stacking portion 309, the control portion 250 controls the image forming portion 220 to perform the image formation based on the image information (original information) stored in the internal memory 252.

After the image forming portion 220 forms images, the resultant S1 is stored in the resultant storing cell 122 of the storage container 102. In other words, if the storage container 102 is not connected, the image formation is not performed in this embodiment. In addition, when the image forming operation is performed, the resultant S1 on which the image is formed is stored in the storage container 102.

After the image formation of the entire original data is finished and every sheet of the resultant S1 is stored in the storage container 102, the user detaches the storage container 102. After that, the user opens the first shutter 105 so as to take out the read original D1 stored in the read original storing cell 104 and further opens the second lid 120 so as to take out the resultant S1.

Figure 6:
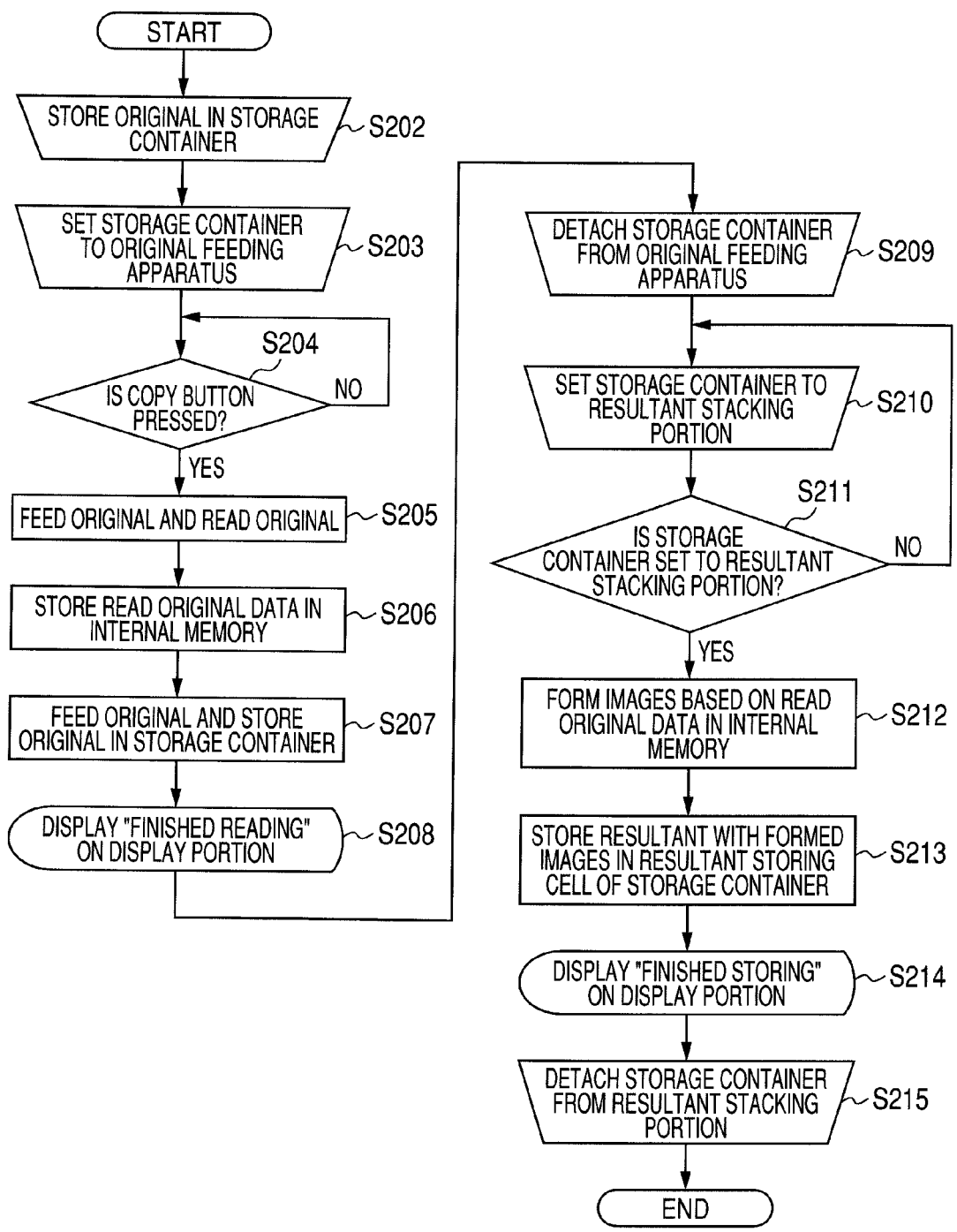
FIG. 6 is a flowchart for describing a copying operation of the copying machine performed by using the storage container.

The copying operation of the copying machine 200 performed by using the storage container 102 is described with reference to the flowchart illustrated in FIG. 6.

If the user copies an original that should not be read by another person, the user stores the original D to be copied in the original storing cell 110 of the storage container 102 (S202). Next, the storage container 102 is set (connected) to the original feeding apparatus 300 (S203). The second shutter 107 is rotated downward against the spring, whereby the feeding portion side of the original storing cell 110, the feeding portion side of the read original storing cell 104, and the feeding portion side of the resultant storing cell 122 is opened.

Next, if the control portion 250 recognizes that the user has pressed the copy button (not shown) of the operation portion 253 (Y in S204), the control portion 250 controls the feeding portion 302 of the original feeding apparatus 300 to feed the original D stored in the original storing cell 110 to the image reading position on the platen glass plate 203 sequentially. The control portion 250 controls the image reading portion 204 to read the original image sequentially at the image reading position (S205).

The control portion 250 controls the internal memory 252 to store the read original data that is original image information sequentially read by the image reading portion 204 (S206). The read original D1 after the image information is read is stored in the read original storing cell 104 of the storage container 102 by the delivery roller 307 (S207).

Next, reading of the original image and storing of the read original D1 are performed sequentially. When every sheet of the read original D1 is stored in the read original storing cell 104, the control portion 250 controls the display portion of the operation portion 253 to display "FINISHED READING" indicating that the reading is finished (S208). When the display is performed, the user detaches the storage container 102 from the original feeding apparatus 300 (S209).

When the storage container 102 is detached, the second shutter 107 returns by the spring to the position for closing the paper feeding portion side of the original storing cell 110, the paper feeding portion side of the read original storing cell 104, and the paper feeding portion side of the resultant storing cell 122. Therefore, even when the storage container 102 is detached, the read original D1 does not drop from the read original storing cell 104. In addition, even if the original D remains in the original storing cell 110, the original D also does not drop.

Next, the storage container 102 that is detached from the original feeding apparatus 300 is set to the resultant stacking portion 309 (S210). When the storage container 102 is set, the engaging portion 106 of the second shutter 107 of the storage container 102 engages with the protruding portion (not shown) of the resultant stacking portion 309, whereby the second shutter 107 is opened. As a result, the delivery roller side of the original storing cell 110, the delivery roller side of the read original storing cell 104, and the delivery roller side of the resultant storing cell 122 is opened.

The control portion 250 determines by the attachment detection sensor 251 whether or not the storage container 102 is set to the resultant stacking portion 309 (S211). If the storage container 102 is not set to the resultant stacking portion 309 (N in S211), another user may perform other copy process or a network print process ordinarily.

If the control portion 250 determines that the storage container 102 is set to the resultant stacking portion 309 (Y in S211), the control portion 250 controls the image forming portion 220 to start the image formation based on the read original data stored in the internal memory 252 (S212). In other words, based on the read original data stored in the internal memory 252, the exposure portion 230 exposes the photosensitive drum 221, whereby an electrostatic latent image is formed on the surface of the photosensitive drum. Then, the electrostatic latent image is developed by the developing device 223, whereby a toner image is formed on the surface of the photosensitive drum. The toner image is transferred onto the sheet and afterward is fixed, with the result that an image is formed on the sheet.

Next, the sheet on which the toner image is formed, that is, the resultant S1 is stored in the resultant storing cell 122 of the storage container 102 by the delivery roller 226 (S213). When the resultant S1 is sequentially stored in the resultant storing cell 122 until the entire resultant S1 is stored, the control portion 250 controls the display portion of the operation portion 253 to display "FINISHED STORING" indicating that the resultant S1 has been stored (S214). When the display is performed, the user detaches the storage container 102 from the resultant stacking portion 309 (S215).

After the storage container 102 is detached, the user opens the first shutter 105 so as to take out the read original D1 stored in the read original storing cell 104 and further opens the second lid 120 of the resultant storing cell 122 so as to take out the resultant S1.

When the original image is read, the storage container 102 storing the original D is attached to the original feeding apparatus 300, whereby the original feeding apparatus 300 feeds the original D to the scanner portion 202 and the read original D1 is stored in the read original storing cell 104. When the resultant S1 is delivered, the storage container 102 is detachably attached to the sheet delivering portion 271, and the resultant S1 is stored in the resultant storing cell 122.

Thus, while the copying operation is actually performed, it is possible to protect the original to be copied from peeping, and thus security of the original set in the original feeding apparatus 300 and the resultant actually taken out and carried can be protected. In addition, it is possible to prevent information leakage due to a left original after copying, mixing of resultants, and carrying away of the resultant by another person.

In other words, the storage container 102 is attached to the original feeding apparatus 300 when the original image is read, and the storage container 102 is attached to the resultant stacking portion 309 when the resultant is delivered. Thus, the original and the resultant can be stored in the same storage container 102. Thus, concealment of the original and the resultant can be secured.

In this embodiment, the storage container 102 is set to the original feeding apparatus 300, and afterward the original image is read. After that, the storage container 102 is detached from the original feeding apparatus 300 and is set to the resultant stacking portion 309.

With this structure, however, the user may inadvertently set another storage container 102 to the resultant stacking portion 309, which is different from the storage container 102 detached from the original feeding apparatus 300.

Therefore, it is necessary not to perform the image formation based on the data stored in the internal memory if the storage container 102 that is set to the resultant stacking portion 309 is different from the storage container 102 detached from the original feeding apparatus 300.

Next, a second embodiment of the present invention is described, in which if the storage container that is set to the resultant stacking portion 309 is different from the storage container detached from the original feeding apparatus 300, the image formation is not performed based on the data stored in the internal memory.

Figure 7:
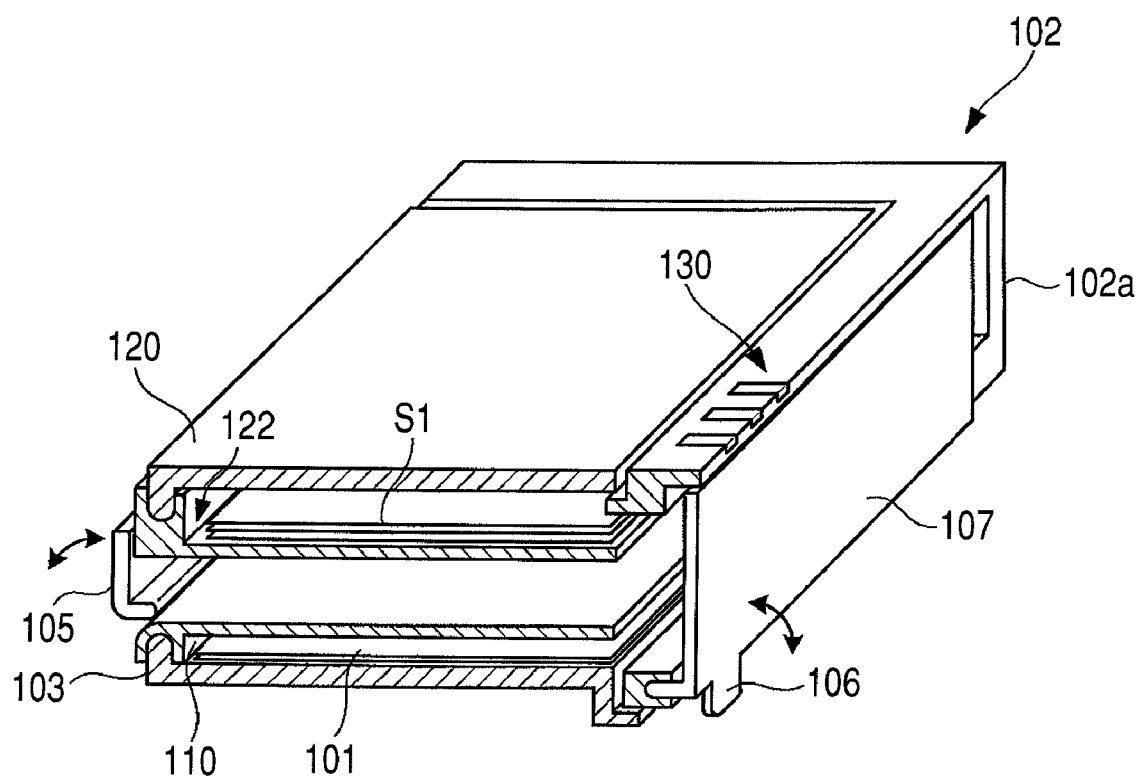
FIG. 7 is a perspective view of the storage container that is detachably attached to a copying machine as an example of an image forming apparatus according to a second embodiment of the present invention.

FIG. 7 is a perspective view of the storage container 102 that is detachably attached to a copying machine that is an example of an image forming apparatus according to this embodiment. In FIG. 7, a reference numeral that is the same as that of FIG. 2 denotes the same or corresponding part.

In FIG. 7, notches 130 are formed on the upper surface of the storage container main body 102a, which are an example of an identifier for identifying the individual storage containers 102. In addition, the resultant stacking portion 309 and the original feeding apparatus 300 are respectively provided with a first identifying sensor 254 and a second identifying sensor 255 as illustrated in FIG. 5 for detecting positions of the notches 130, when the storage container 102 is attached.

The notches 130 and the first identifying sensor 254 form a first identifying portion for identifying the storage container 102. The notches 130 and the second identifying sensor 255 form a second identifying portion for identifying the storage container 102.

When the storage container 102 is set to the original feeding apparatus 300, the control portion 250 performs identification of the individual storage container 102 based on a signal from the first identifying sensor 254. In addition, when the storage container 102 is set to the resultant stacking portion 309, the control portion 250 determines whether or not the storage container 102 is the same as the storage container 102 detached from the original feeding apparatus 300 based on the signal from the second identifying sensor 255.

If the control portion 250 determined that the storage container 102 set to the resultant stacking portion 309 is the same as the storage container 102 detached from the original feeding apparatus 300, the image formation process is started for forming the read image.

Figure 8:
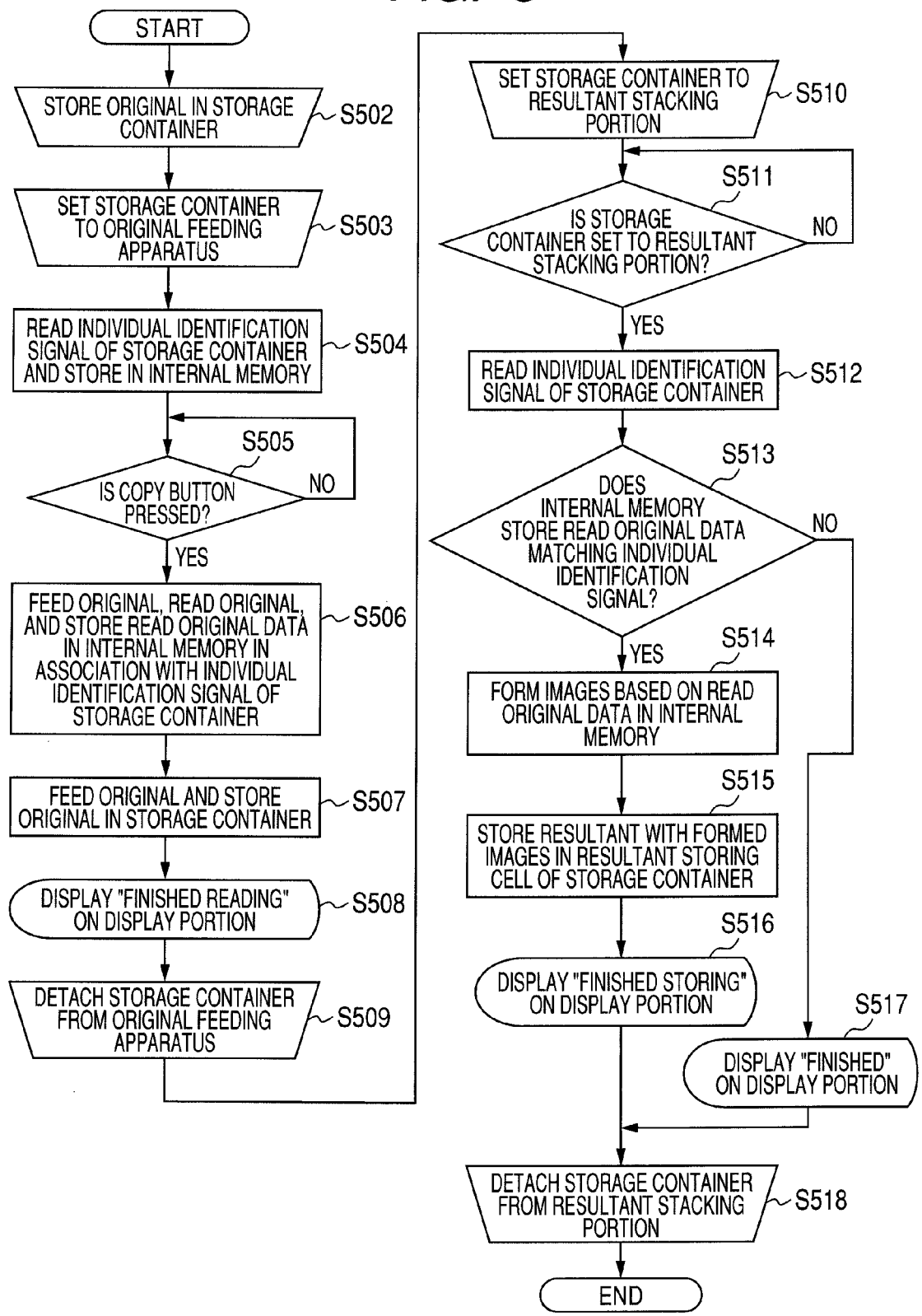
FIG. 8 is a flowchart for describing a copying operation of the copying machine, which is performed by using the storage container.

Next, the copying operation of the copying machine 200 performed by using the storage container 102 of this embodiment is described with reference to the flowchart illustrated in FIG. 8.

If the user copies an original that should not be read by another person, the user stores the original D to be copied in the original storing cell 110 of the storage container 102 (S502). Next, the storage container 102 is set (connected) to the original feeding apparatus 300 (S503). On this occasion, the second shutter 107 is rotated downward against the spring, whereby the feeding portion side of the original storing cell 110, the feeding portion side of the read original storing cell 104, and the feeding portion side of the resultant storing cell 122 is opened.

When the storage container 102 is set, the control portion 250 reads an individual identification signal of the storage container 102 set to the original feeding apparatus 300 with the first identifying sensor 254 provided to the original feeding apparatus 300, and it is stored in the internal memory 252 (S504). Next, when the control portion 250 recognizes that the user has pressed the copy button of the operation portion 253 (Y in S505), the control portion 250 controls the feeding portion 302 of the original feeding apparatus 300 so that the original D stored in the original storing cell 110 is conveyed to the image reading position on the platen glass plate 203.

Then, the control portion 250 controls the image reading portion 204 to read the original image at the image reading position. The control portion 250 controls the internal memory 252 to store the read image data in association with the individual identification signal of the storage container 102 (S506). The read original D1 from which the image information has been read is stored in the read original storing cell 104 of the storage container 102 by the delivery roller 307 (S507).

Next, reading of the original image and storing of the read original D1 are performed sequentially. When every sheet of the read original D1 is stored in the read original storing cell 104, the control portion 250 controls the display portion of the operation portion 253 to display "FINISHED READING" indicating that the reading is finished (S508). After the display performed by the operation portion, the user detaches the storage container 102 from the original feeding apparatus 300 (S509).

When the storage container 102 is detached, the second shutter 107 returns by the spring to the position for closing one side of the original storing cell 110, one side of the read original storing cell 104, and one side of the resultant storing cell 122. Therefore, even when the storage container 102 is detached, the read original D1 does not drop from the read original storing cell 104. In addition, even if the original D remains in the original storing cell 110, the original D also does not drop.

Next, the storage container 102 that is detached from the original feeding apparatus 300 is set to the resultant stacking portion 309 (S510). When the storage container 102 is set, the second shutter 107 is opened. As a result, the delivery roller side of the original storing cell 110, the delivery roller side of the read original storing cell 104, and the delivery roller side of the resultant storing cell 122 is opened.

The control portion 250 determines by the attachment detection sensor 251 whether or not the storage container 102 is set to the resultant stacking portion 309 (S511). If the storage container 102 is not set to the resultant stacking portion 309 (N in S511), another user may perform other copy process or a network print process ordinarily.

If the control portion 250 determines that the storage container 102 is set to the resultant stacking portion 309 (Y in S511), the control portion 250 controls the second identifying sensor 255 to read the individual identification signal of the storage container 102 attached to the resultant stacking portion 309 (S512). The control portion 250 checks whether or not the internal memory 252 stores the read original data that matches the individual identification signal of the storage container 102 (S513).

If the control portion 250 determines that there is the read original data that matches the identification signal (Y in S513), the control portion 250 controls the image forming portion 220 to start the image formation based on the data stored in the internal memory 252 (S514). The sheets on which toner images are formed, that is, the resultant S1 is stored in the resultant storing cell 122 of the storage container 102 by the delivery roller 226 (S515).

When the resultant S1 is stored in the storage container 102 and then the entire resultant S1 is stored, the control portion 250 controls the display portion of the operation portion 253 to display "FINISHED STORING" indicating that the resultant has been stored (S516). When the display is performed, the user detaches the storage container 102 from the resultant stacking portion 309 (S518).

If the control portion 250 determines that there is no read original data matching the individual identification signal (N in S513), the control portion 250 controls the display portion of the operation portion 253 to display "FINISHED" (S517), and the user detaches the storage container 102 from the resultant stacking portion 309 (S518).

In this embodiment, the first and second identifying portions for identifying the storage container 102 are provided, and the control portion 250 determines whether or not the storage container 102 set to the resultant stacking portion 309 is the same as the storage container 102 set to the original feeding apparatus 300. If it is determined that those storage containers 102 are not the same, the operation portion displays to inform that those storage containers 102 are not the same, and the image formation is not performed based on the original data stored in the internal memory 252. In other words, the image forming portion 220 is controlled to perform the image forming operation when identification results by the first and second identifying portions are the same.

In this embodiment, the storage container 102 is identified, and the resultant can be taken out only by the storage container 102 that is the same as the storage container 102 set to the original feeding apparatus 300. Thus, it is possible to prevent information leakage due to mixing of the resultant with that of another image formation or carrying away of the resultant by a person other than the owner, whereby concealment of the original and the resultant can be secured.

Although the identifying portion is formed of the notches and the sensor in this embodiment, the structure of the identifying portion is not limited thereto. For instance, it is possible to form the identifying portion using a memory chip or the like embedded in the storage container 102 and a sensor provided to the original feeding apparatus 300 and the resultant stacking portion 309 for reading the memory chip embedded in the storage container 102.

If the identifying portion is provided as in this embodiment, the user can perform reading of the original in advance, record and store the original data in the internal memory 252, and then the user can set the storage container 102 to the resultant stacking portion 309 at any time, thereby obtaining the resultant. According to this method, even when multiple users respectively use different storage containers, resultants can be obtained simultaneously while maintaining security protection.

Next, a third embodiment of the present invention is described, in which multiple users can respectively use different storage containers.

Figure 9:
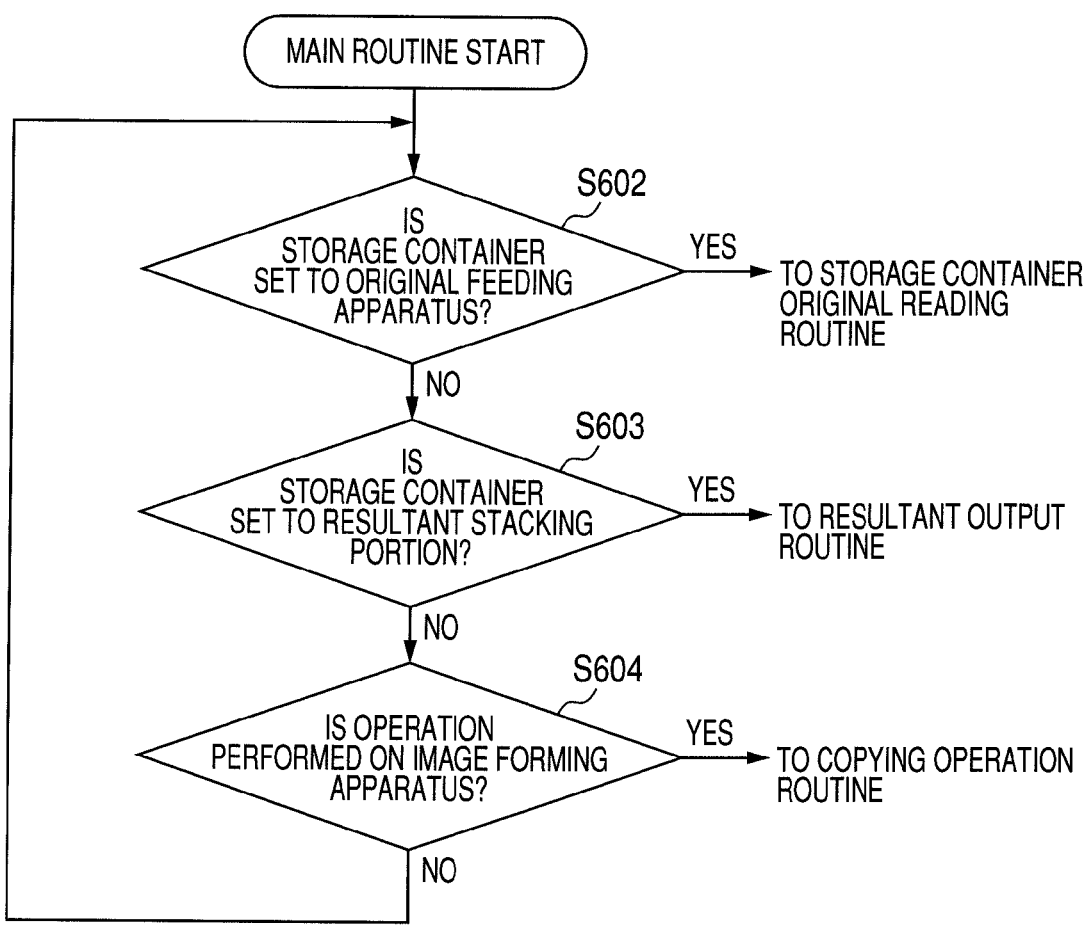
FIG. 9 is a first flowchart for describing a copying operation of a copying machine as an example of an image forming apparatus according to a third embodiment of the present invention, which is performed by using the storage container.

FIG. 9 is a flowchart for describing a copying operation of a copying machine as an example of the image forming apparatus performed by using the storage container according to this embodiment.

In a case that multiple users respectively use different storage containers, when a main routine is started, the control portion 250 determines whether or not the storage container 102 is set (connected) to the original feeding apparatus 300 (S602). Next, the control portion 250 determines whether or not the storage container 102 is set (connected) to the resultant stacking portion 309 (S603). Next, the control portion 250 determines whether or not the copying operation has been performed with no storage container 102 being connected (set) (S604).

Figure 10:
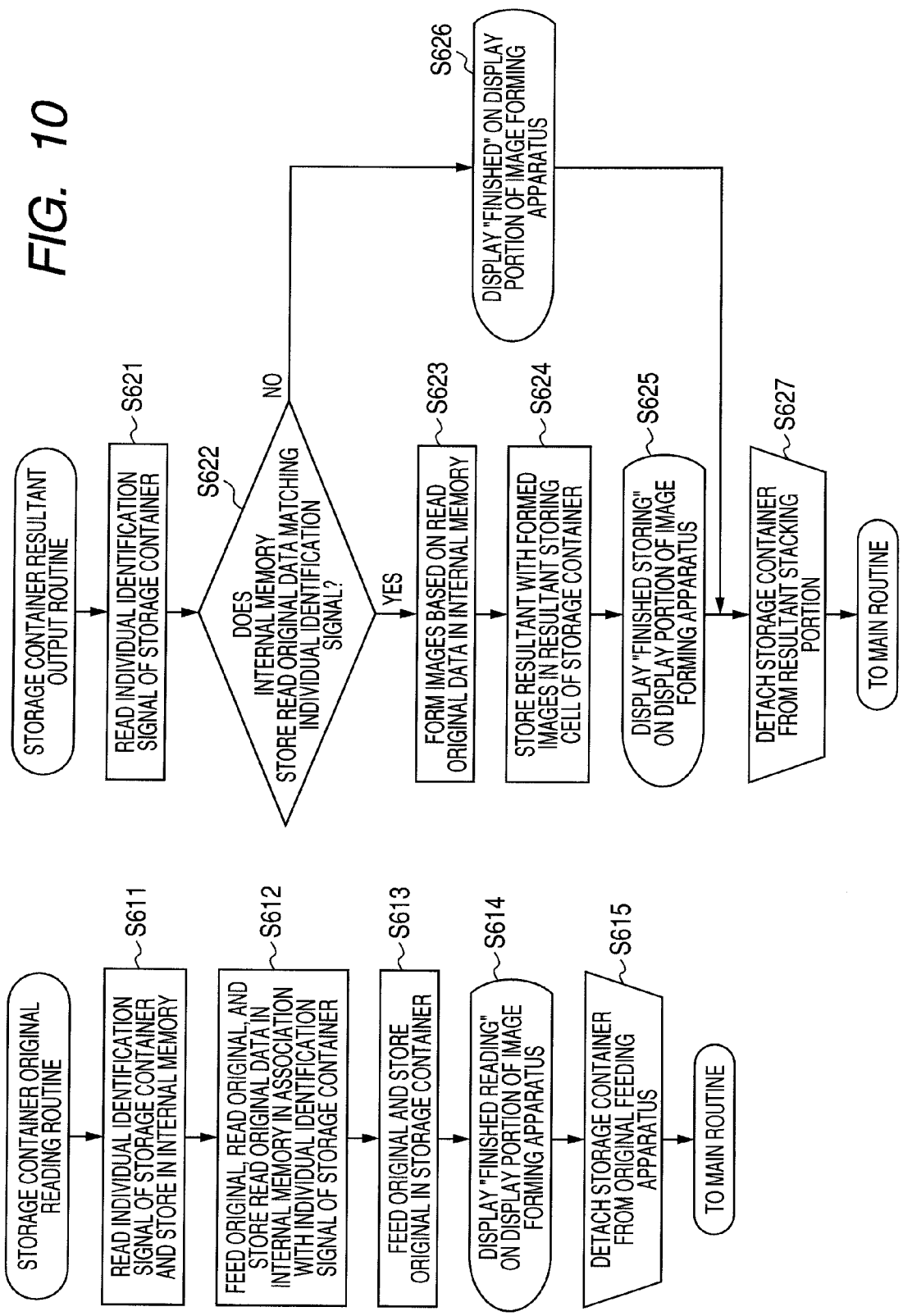
FIG. 10 is a second flowchart describing the copying operation.

In the decision as to whether or not the storage container 102 is set (connected) to the original feeding apparatus 300 (S602), if the control portion 250 confirms that the storage container 102 is connected (Y in S602), the process branches to a storage container original reading routine illustrated in FIG. 10.

In the decision as to whether or not the storage container 102 is set (connected) to the resultant stacking portion 309 (S603), if the control portion 250 confirms that the storage container 102 is connected, the process branches to a storage container resultant output routine illustrated in FIG. 10. If an operation is performed on the copying machine in the state where the process does not branch to the storage container original reading routine and to the storage container resultant output routine, the control portion 250 determines that a normal operation of the copying machine except for the copying operation relating to the storage container 102 has been performed, and thus the process branches to a copying operation routine (not shown).

Next, the storage container original reading routine illustrated in FIG. 10 is described.

The control portion 250 reads the individual identification signal of the storage container 102 set to the original feeding apparatus 300 with the first identifying sensor 254 and controls the internal memory to store the signal (S611). Next, the feeding portion 302 of the original feeding apparatus 300 feeds the original onto the platen glass plate 203. After that, the image reading portion 204 reads the original image sequentially, and the control portion 250 controls the internal memory to store the read data in association with the individual identification signal of the storage container (S612).

Next, the read original D1 from which the image information has been read sequentially is stored in the read original storing cell 104 of the storage container 102 by the delivery roller 307 (S613). After that, when the entire read original D1 has been stored in the read original storing cell 104, the control portion 250 controls the display portion of the operation portion to display "FINISHED READING" indicating that the reading operation has been finished (S614). After this display performed by the operation portion, the user detaches the storage container 102 from the original feeding apparatus 300 (S615). After finishing this operation, the process routine goes back to the main routine.

Next, the storage container resultant output routine is described. In this case, when the storage container 102 detached from the original feeding apparatus 300 is set to the resultant stacking portion 309, the control portion 250 reads the individual identification signal of the storage container 102 attached to the resultant stacking portion 309 with the second identifying sensor 255 (S621). Then, the control portion 250 checks whether or not there is read image data in relation to the individual identification signal of the storage container stored in the internal memory (S622).

If the control portion 250 determines that there is the read image data in relation to the individual identification signal (Y in S622), the control portion 250 controls the image forming portion 220 to start the image formation based on the data stored in the internal memory (S623), whereby the toner image is formed on the sheet.

Next, the resultant S1 on which the toner image is formed is stored in the resultant storing cell 122 of the storage container 102 by the delivery roller 226 (S624). When the resultant S1 is stored in the storage container 102 until the entire resultant S1 is stored, the control portion 250 controls the display portion of the operation portion to display "FINISHED STORING" indicating that the resultant has been stored (S625). When the display is performed, the user detaches the storage container 102 from the resultant stacking portion 309 (S627).

If the control portion 250 determines that there is no image data in relation to the individual identification signal (N in S622), the control portion 250 controls the display portion of the operation portion to display "FINISHED" (S626). Then, the user detaches the storage container 102 from the resultant stacking portion 309 (S627), and the process goes back to the main routine (S601).

With this structure, only the resultant from the original corresponding to the storage container 102 can be stored in the storage container 102. Therefore, it is possible to prevent another person from taking out the resultant by mistake, and thus concealment of the original and the resultant can be secured. In addition, with the structure of this embodiment, multiple storage containers can be used properly and freely in one copying machine (image forming apparatus), leading to improved convenience.

Figure 11:
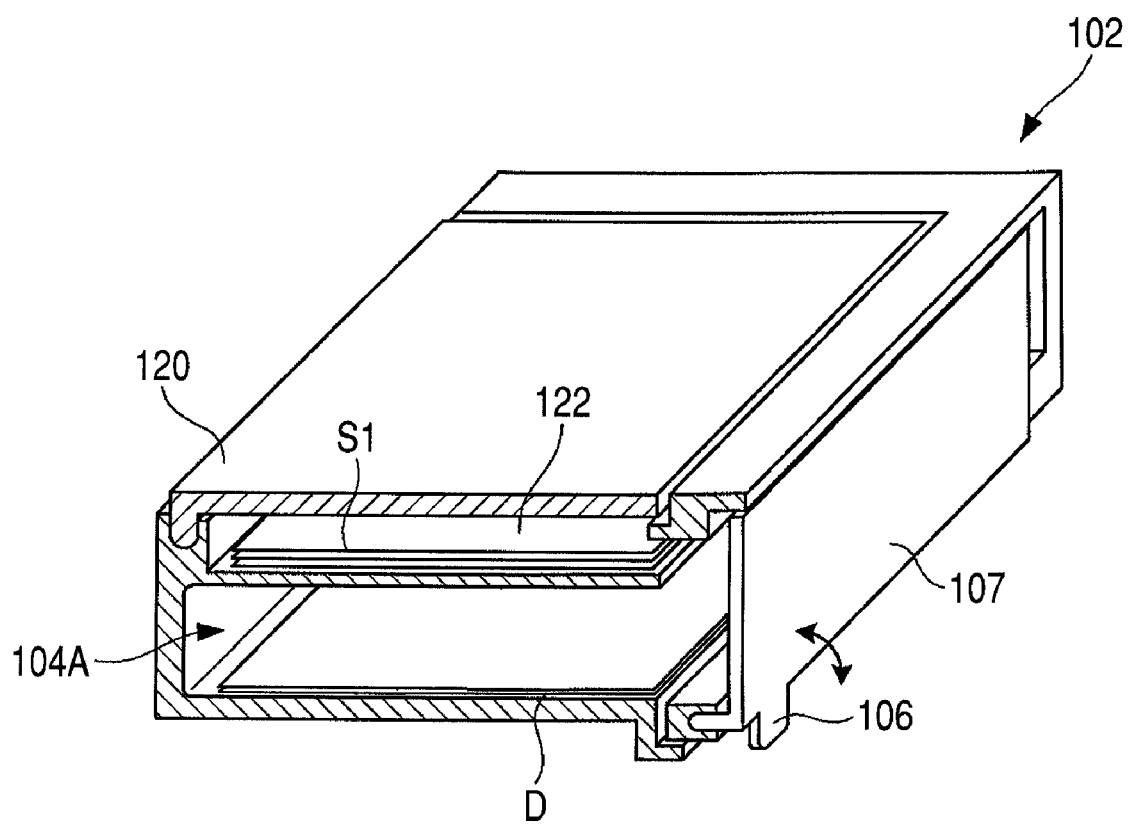
FIG. 11 is a perspective view illustrating another structure of the storage container.

Although the storage container 102 having the three-cell structure as illustrated in FIG. 2 is used so that the original and the read original can be stored separately in the description above, the present invention is not limited to this structure. For instance, the storage container 102 may have a two-cell structure as illustrated in FIG. 11, in which the original D and the read original D1 are stored in the same first storing portion 104A. With this structure, the original is stored in the first storing portion 104A and the read original D is taken out from the first storing portion 104A by opening the second shutter 107. In addition, it is possible to use a single cell storage container in which the original before the reading, the original after the reading, and the sheets on which images are formed are stored in the same storing space of the storage container 102.

The storage container 102 may be provided with a mechanical or electronic lock portion, whereby the original and the resultant stored in the storage container 102 can be protected. For instance, the lock prevents the first lid 103 and the second lid 120 from being opened.

Figure 12:
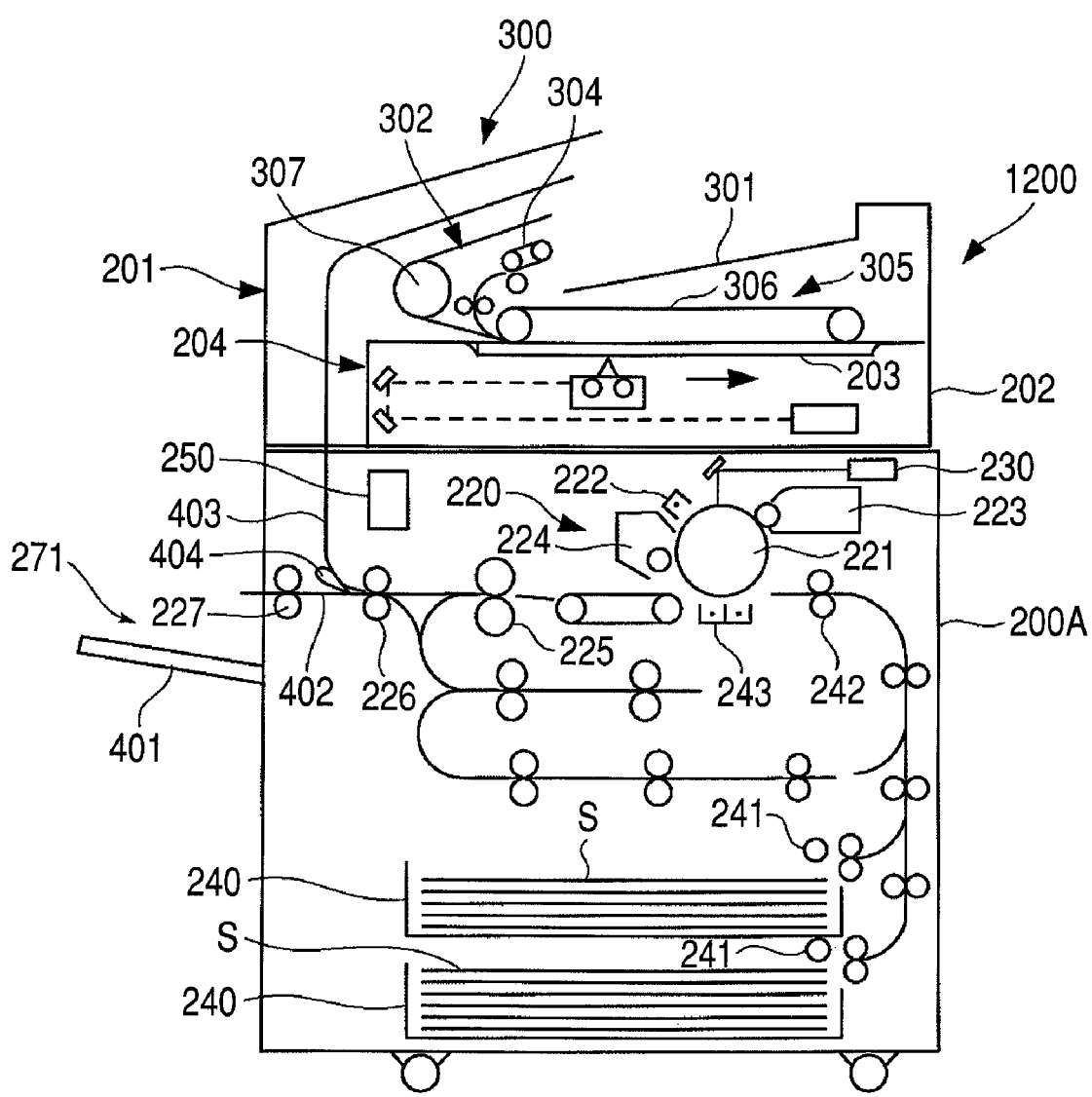
FIG. 12 illustrates a structure of a copying machine as an example of an image forming apparatus according to a fourth embodiment of the present invention.
Figure 13:
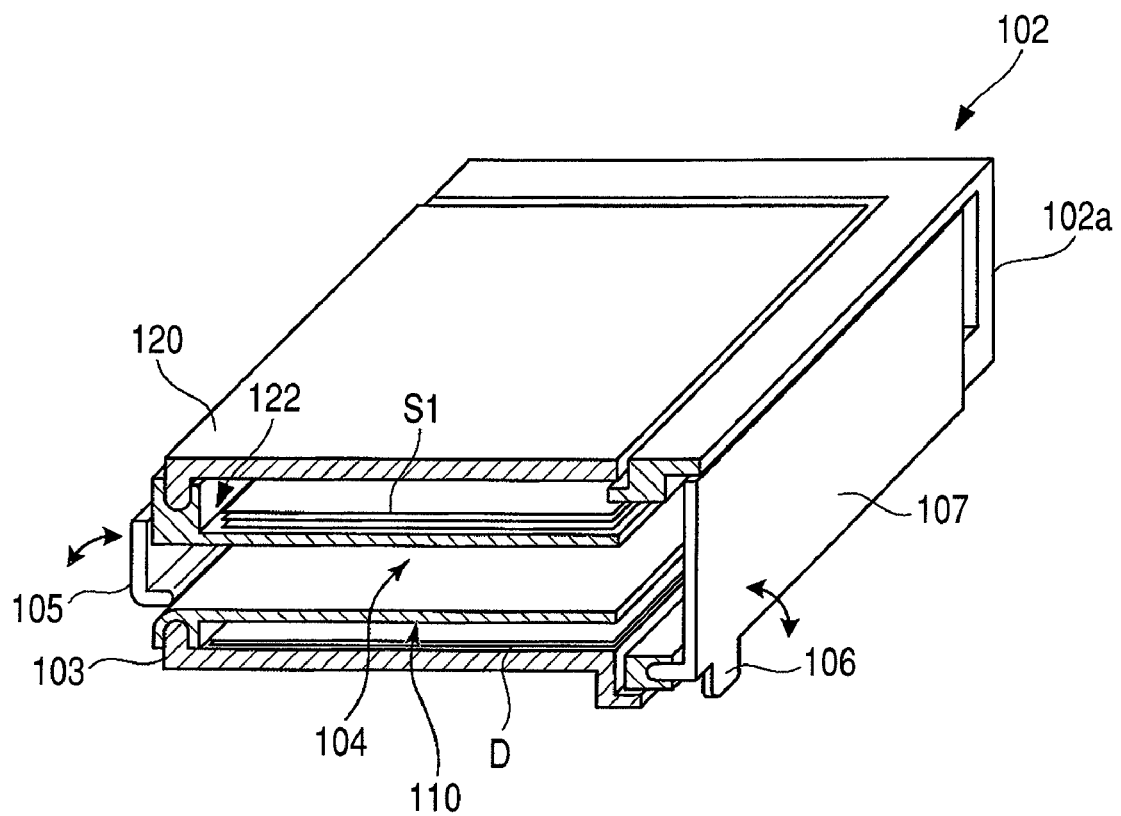
FIG. 13 is a perspective view of a storage container that is detachably attached to the copying machine.

FIG. 12 is a drawing illustrating a structure of a copying machine as an example of an image forming apparatus according to a fourth embodiment of the present invention.

Figure 14:
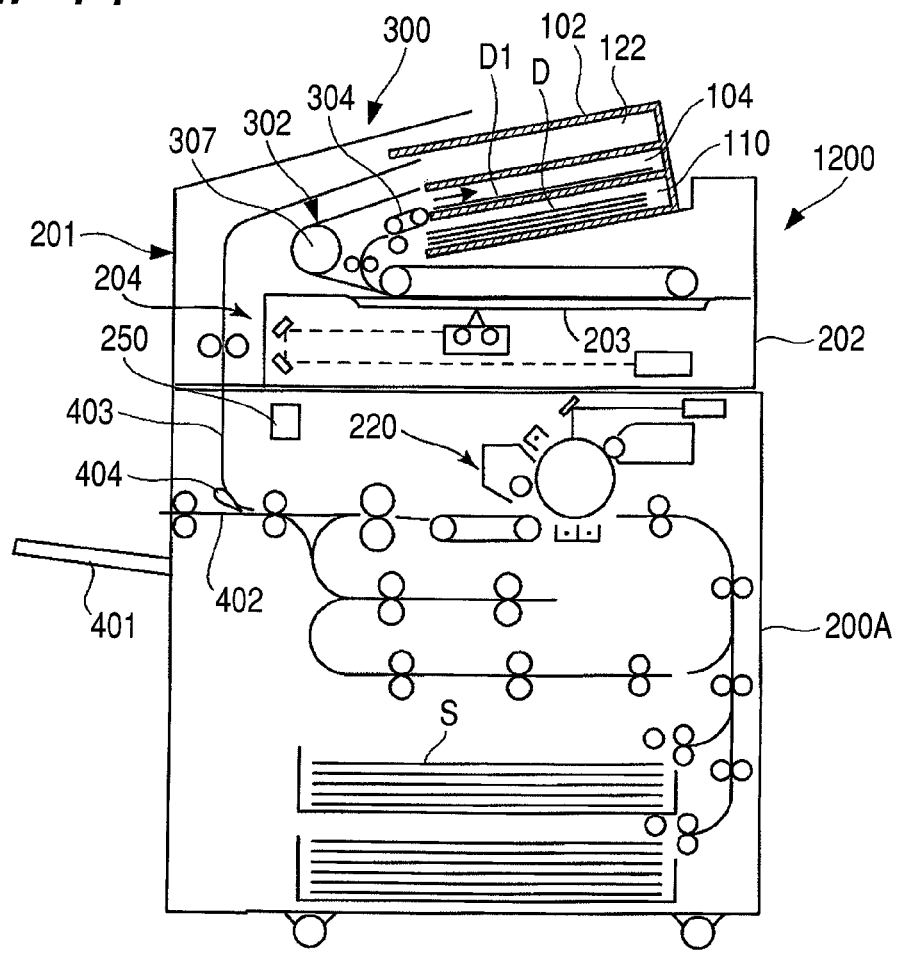
FIG. 14 illustrates a state in which the storage container is detachably attached to an original convey device of the copying machine.

In FIG. 12, description of a structure similar to that of the first embodiment described above is omitted. In this embodiment, if the original for which concealment should be secured, such as a confidential document that should not be read by another person, is copied, the original such as a confidential document is stored in the storage container 102 serving as a storing portion. After that, the storage container 102 is detachably set to the copying machine main body 200A, for example, to the original feeding apparatus 300 as illustrated in FIG. 14. The structure of the storage container 102 is the same as that of the first to fourth embodiments mentioned above, and thus detailed description thereof is omitted.

When the reading of the entire original D is finished in this embodiment, the image forming portion 220 forms images on the sheets. The resultant S1 on which images are formed is stored in the resultant storing cell 122 of the storage container 102. In other words, if the image forming operation is performed in this embodiment, the resultant S1 with the formed images is stored in the storage container 102. With this structure, it is possible to prevent the original to be copied from being peeped while the copying operation is performed. In addition, security of the original set in the original feeding apparatus 300 and the resultant that is actually taken out and carried can be protected.

In this embodiment, as illustrated in FIG. 14, in order to store the resultant S1 with formed images in the resultant storing cell 122 of the storage container 102, there is provided a storing path 403 branched from a sheet delivering path 402 for conveying ordinary sheets to the delivery tray 401. A switch member 404 is disposed at a branch point between the storing path 403 and the sheet delivering path 402, whereby the sheet with a formed image is selectively guided to any of the storing path 403 and the sheet delivering path 402. The switch member 404 is switched by a solenoid SL illustrated in FIG. 15. In this embodiment, when the resultant S1 is selectively stored in the resultant storing cell 122, the solenoid SL is turned on so that the switch member 404 is rotated downward.

Figure 15:
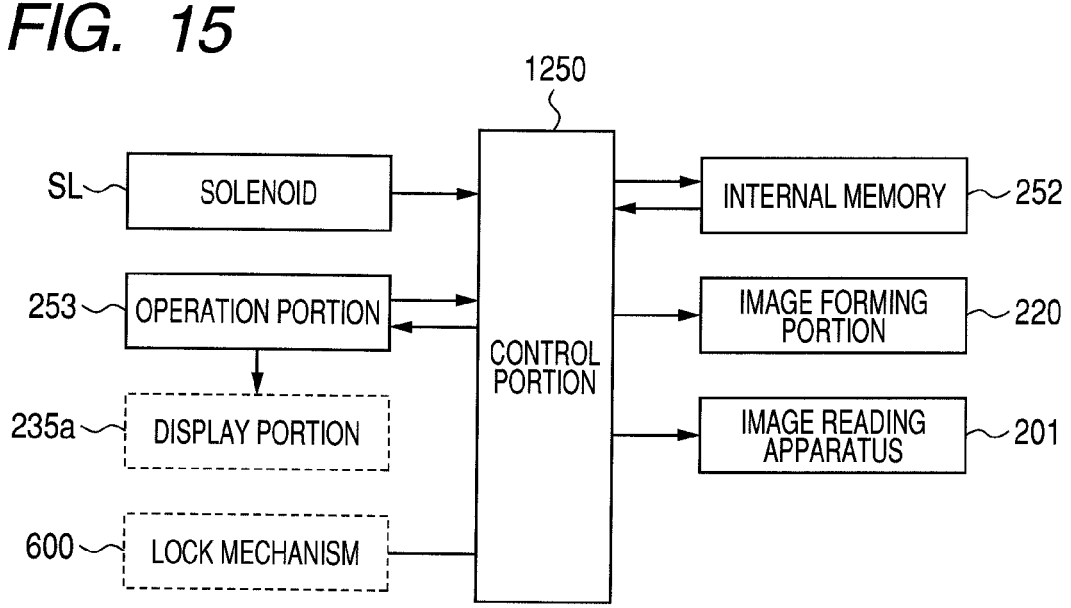
FIG. 15 is a control block diagram of the copying machine.

FIG. 15 is a control block diagram of a copying machine 1200. As illustrated in FIG. 15, a control portion 1250 is connected with a solenoid SL, an operation portion 253 including a copy button (not shown) and a display portion 235a, an internal memory 252, an image forming portion 220, and an image reading apparatus 201. In addition, the control portion 1250 is selectively connected with a lock mechanism 600 according to a fifth embodiment.

Next, a copying operation of the copying machine 1200 performed by using the storage container 102 is described.

First, the user opens the first lid 103 of the storage container 102, thereby storing the original D in the original storing cell 110. After that, the storage container 102 storing the original D is set to the original feeding apparatus 300 in an inclined state as illustrated in FIG. 14. On this occasion, the engaging portion 106 of the second shutter 107 of the storage container 102 engages with the protruding portion of the original feeding apparatus 300, whereby the second shutter 107 is opened. As a result, the feeding portion side of the original storing cell 110, the feeding portion side of the read original storing cell 104, and the feeding portion side of the resultant storing cell 122 is opened, and the original D stored in the original storing cell 110 is moved toward the feeding portion 302 of the original feeding apparatus 300.

Next, when the copy button is pressed in this state, the original D stored in the original storing cell 110 is fed by the feeding portion 302 of the original feeding apparatus 300 onto the platen glass plate 203, and thus the image reading portion 204 reads images of the original. After the images are read, the read original D1 is stored in the read original storing cell 104 of the storage container 102 by reversing of the conveyor belt 306 and by the delivery roller 307. Image information read sequentially from the original D is temporarily stored in the internal memory 252.

Next, when the entire original D has been read, the image forming portion 220 performs the image formation based on the image information stored in the internal memory 252, and the solenoid is turned on so that the switch member 404 is rotated downward. Thus, the resultant S1 on which the image forming portion 220 has formed images is selectively guided to the storing path 403 by the switch member 404 and is stored in the resultant storing cell 122 of the storage container 102.

After the image formation of the entire original data on the sheets is finished and every sheet of the resultant S1 is stored in the storage container 102, the user detaches the storage container 102. After that, the user opens the first shutter 105 so as to take out the read original D1 stored in the read original storing cell 104 and further opens the second lid 120 so as to take out the resultant S1 from the resultant storing cell 122.

Figure 16:
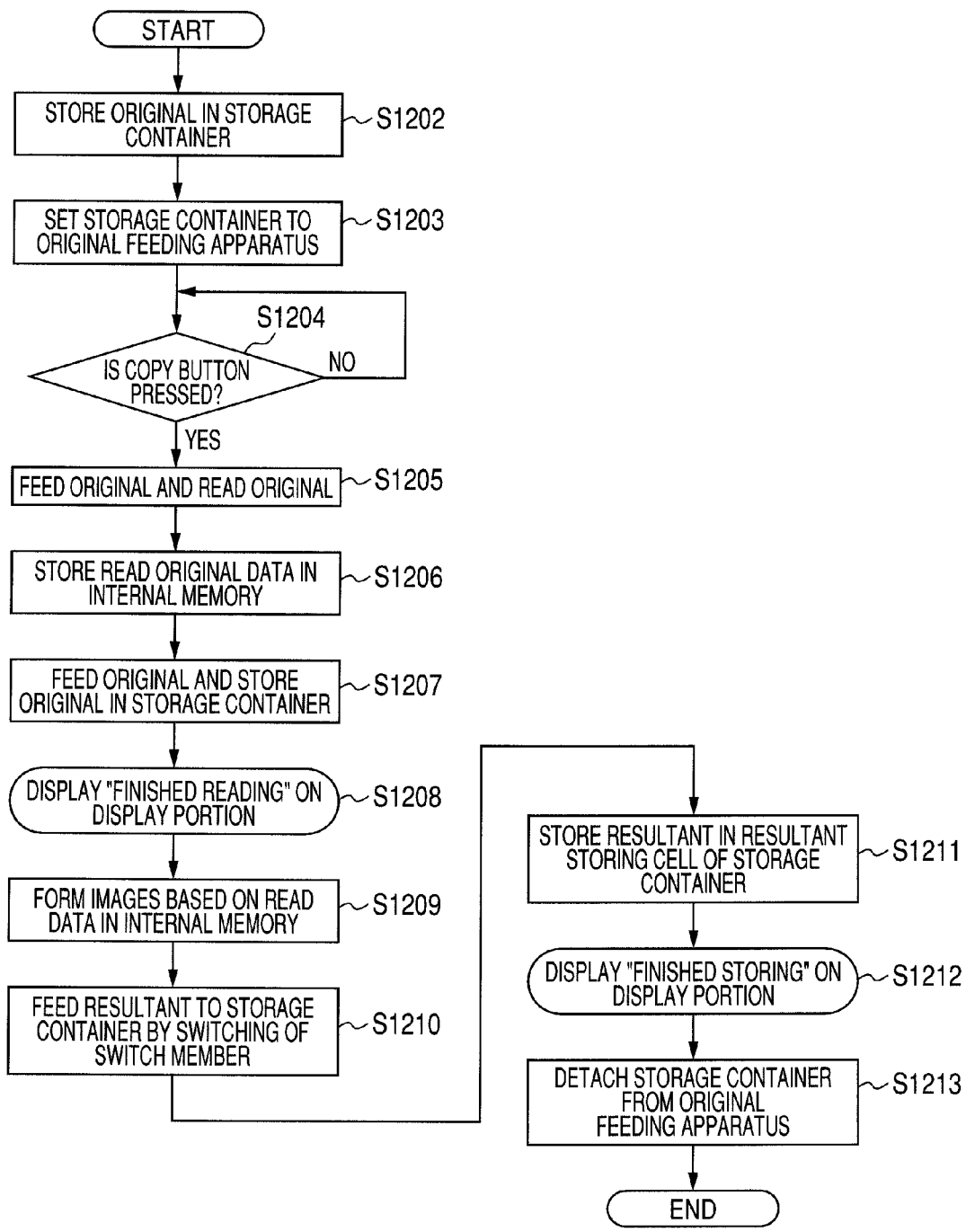
FIG. 16 is a flowchart for describing a copying operation of the copying machine, which is performed by using the storage container.

Next, the copying operation of the copying machine 1200 performed by using the storage container 102 is described with reference to the flowchart illustrated in FIG. 16.

If the user copies an original that should not be read by another person, the user stores the original D to be copied in the original storing cell 110 of the storage container 102 (S1202). Next, the storage container 102 is set (connected) to the original feeding apparatus 300 (S1203). On this occasion, the second shutter 107 is rotated downward against the spring, whereby the feeding portion side of the original storing cell 110, the feeding portion side of the read original storing cell 104, and the feeding portion side of the resultant storing cell 122 is opened.

Next, if the control portion 1250 recognizes that the user has pressed the copy button (not shown) of the operation portion 253 (Y in S1204), the control portion 1250 controls the feeding portion 302 of the original feeding apparatus 300 to feed the original D stored in the original storing cell 110 to the image reading position on the platen glass plate 203 sequentially. Then, the control portion 1250 controls the image reading portion 204 to read the original image sequentially at the image reading position (S1205).

The control portion 1250 controls the internal memory 252 to store the read original data that is original image information sequentially read by the image reading portion 204 (S1206). The read original D1 after the image information is read is conveyed by the delivery roller 307 and is stored in the read original storing cell 104 of the storage container 102 (S1207).

Next, reading of the original image and storing of the read original D1 are performed sequentially. When every sheet of the read original D1 is stored in the read original storing cell 104, the control portion 1250 controls the display portion 235a of the operation portion 253 to display "FINISHED READING" indicating that the reading is finished (S1208). After the display, the control portion 1250 controls the image forming portion 220 to start the image formation based on the read data stored in the internal memory 252 (S1209).

Next, the image forming portion 220 controls an operation of the switch member 404 so that the resultant S1 with the formed images is conveyed to the storing path 403 serving as a sheet storing path by switching operation of the switch member 404 (S1210). The sheets on which images are formed are stored in the resultant storing cell 122 serving as a storing cell of the storage container 102 by the delivery roller 226 (S1211). After that, the resultant S1 is sequentially stored in the resultant storing cell 122. When the entire resultant S1 is stored, the control portion 1250 controls the display portion 235a of the operation portion 253 to display "FINISHED STORING" indicating that the resultant S1 has been stored (S1212). When the display is performed, the user detaches the storage container 102 from the original feeding apparatus 300 (S1213).

After detaching the storage container 102, the user opens the first shutter 105 so as to take out the read original D1 from the read original storing cell 104. The user further opens the second lid 120 of the resultant storing cell 122 so as to take out the resultant S1.

When the original image is read, the storage container 102 storing the original D is attached to the original feeding apparatus 300, whereby the original feeding apparatus 300 feeds the original D to the scanner portion 202 and the read original D1 is stored in the read original storing cell 104. In addition, the resultant S1 is stored in the resultant storing cell 122.

With this structure, it is possible to prevent the original to be copied from being peeped while the copying operation is actually performed. Thus, security of the original set in the original feeding apparatus 300 and the resultant that is actually taken out and carried can be protected. In addition, it is possible to prevent information leakage due to a left original after copying, mixing of resultants, and carrying away of the resultant by another person.

As described above, in this embodiment, the original D is stored in the original storing cell 110 while the read original D1 is stored in the read original storing cell 104. In addition, the storing path 403 is provided so that the resultant S1 is stored in the sheet storing portion by the storing path 403.

Thus, concealment of the original D, the read original D1, and the resultant S1 can be secured. In addition, the original D, the read original D1, and the resultant S1 can be stored in the same storage container 102, and hence there is no risk that the original D, the read original D1, and the resultant S1 are carried away.

In this embodiment, after the storage container 102 is set to the original feeding apparatus 300, the original image is read. After that, the resultant is stored in the storage container 102. With this structure, the original and the resultant cannot be viewed while the original is read or while the image formation is performed. Also in this case, it is necessary to protect the storage container 102 set to the original feeding apparatus 300 from being detached inadvertently by the user.

Next, a fifth embodiment of the present invention is described, in which the user cannot detach the storage container 102 from the original feeding apparatus 300 by mistake during the image formation.

Figure 17A:
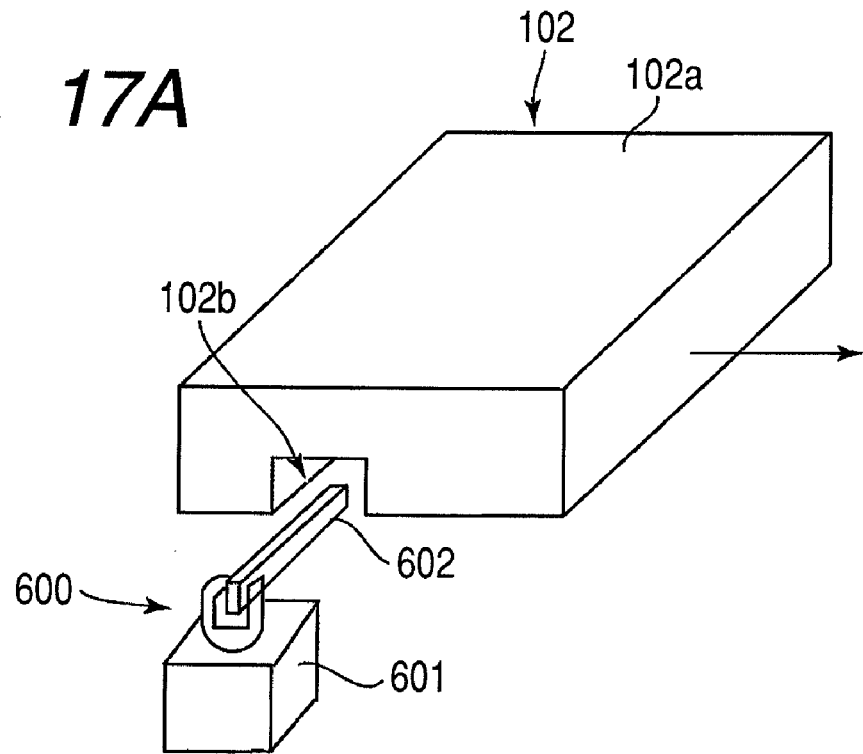
FIGS. 17A and 17B describe a structure of a lock mechanism for locking the storage container, which is provided to a copying machine as an example of an image forming apparatus according to a fifth embodiment of the present invention.
Figure 17B:
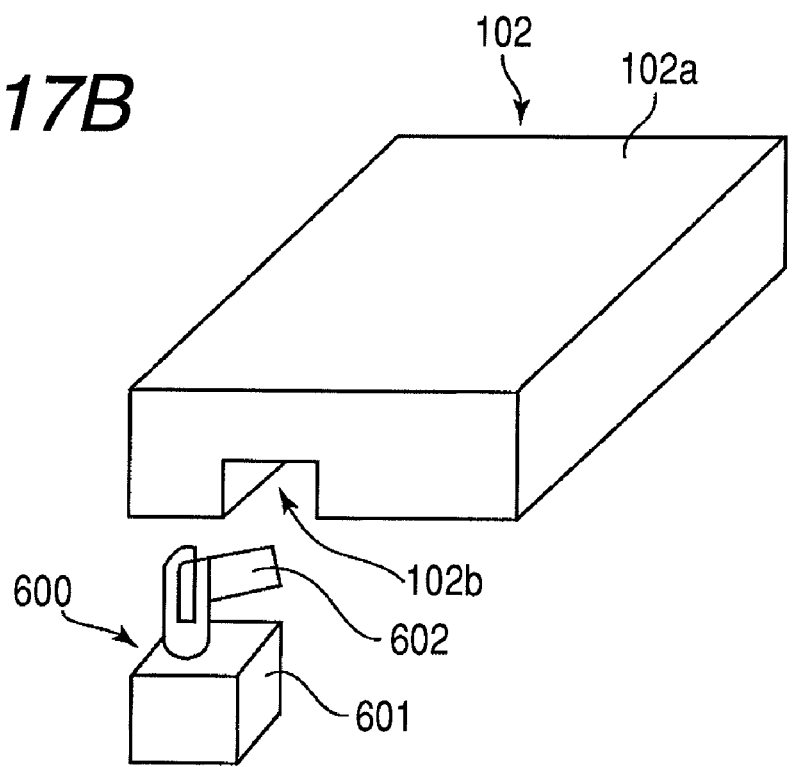

FIGS. 17A and 17B illustrate a structure of the lock mechanism for locking the storage container 102 so that the user does not inadvertently detach the storage container 102 set to the original feeding apparatus 300 according to this embodiment.

In FIGS. 17A and 17B, an operation of the lock mechanism 600 is controlled by the control portion 1250. The lock mechanism 600 includes a lever 602 that detachably engages with an engaging portion 102b formed in the storage container main body 102a of the storage container 102, and an actuator 601 for moving the lever 602.

The actuator 601 includes a solenoid, a motor, or the like, which normally moves the lever 602 to a lower retreating position as illustrated in FIG. 17B so that setting of the storage container 102 to the original feeding apparatus 300 is not interfered. When the copy button is pressed, the actuator 601 operates so that the lever 602 fits in the engaging portion 102b of the storage container main body 102a as illustrated in FIG. 17A.

The lever 602 fits in the engaging portion 102b. Thus, even if the storage container 102 is tried to be drawn out in the arrow direction of FIG. 17A, the drawing out is restricted by the lever 602 engaging with the storage container 102 in the direction perpendicular to the drawing out direction.

When the entire resultant S1 is stored in the resultant storing portion 122 of the storage container 102, the display portion displays that the resultant has been stored. In addition, an OFF signal is applied to the actuator 601 so that the actuator 601 is deactivated. Thus, the engaging portion 102b of the storage container 102 is disengaged from the lever 602, and the lock mechanism 600 stops to retain the storage container 102. Thus, the storage container 102 can be detached.

Figure 18:
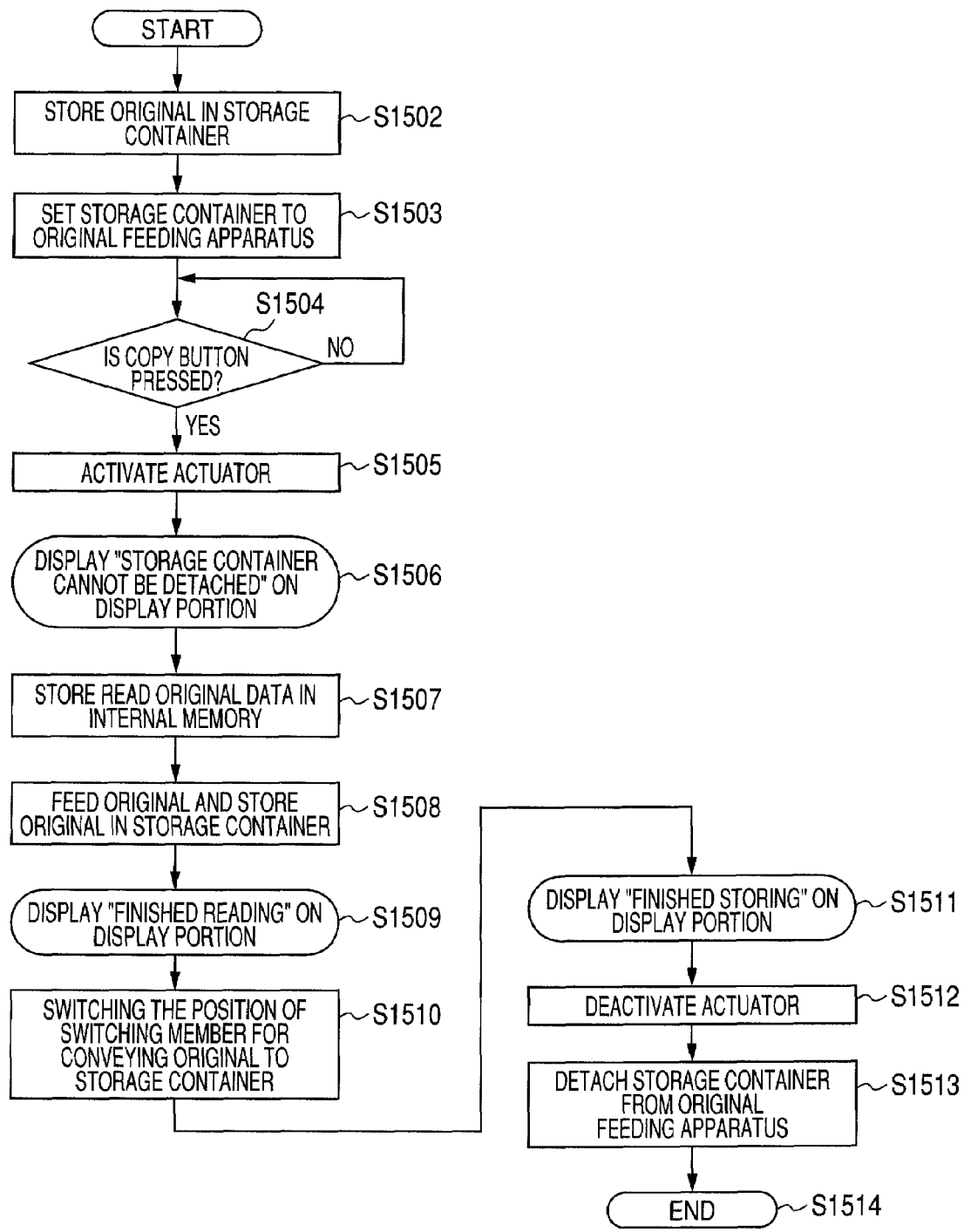
FIG. 18 is a flowchart illustrating a copying operation of the copying machine, which is performed by using the storage container.

Next, the copying operation of the copying machine 1200 performed by using the storage container 102 is described with reference to the flowchart illustrated in FIG. 18.

If the user copies an original that should not be read by another person, the user stores the original D to be copied in the original storing cell 110 of the storage container 102 (S1502). Next, the storage container 102 is set (connected) to the original feeding apparatus 300 (S1503). On this occasion, the second shutter 107 is rotated downward against the spring, whereby the feeding portion side of the original storing cell 110, the feeding portion side of the read original storing cell 104, and the feeding portion side of the resultant storing cell 122 is opened.

Next, when the control portion 1250 recognizes that the user presses the copy button (not shown) of the operation portion 253 (Y in S1504), an ON signal is applied to the actuator 601 of the lock mechanism 600 so that the actuator 601 is activated (S1505). Thus, the lever 602 fits in the engaging portion 102b of the storage container main body 102a, and the storage container 102 is retained so as not to be drawn out. In addition, the control portion 1250 controls the display portion 235a of the operation portion 253 to display "STORAGE CONTAINER CANNOT BE DETACHED DURING COPYING" (S1506).

Next, the control portion 1250 controls the feeding portion 302 of the original feeding apparatus 300 to sequentially feed the original D stored in the original storing cell 110 to the image reading position on the platen glass plate 203. The image reading portion 204 sequentially reads the original at the image reading position, and the control portion 1250 controls the internal memory 252 to store the read original data that was read sequentially (S1507). The read original D1 from which the image information has been read is conveyed by the delivery roller 307 and is stored in the read original storing cell 104 of the storage container 102 (S1508).

When the reading of the original image and the storing of the read original D1 are performed sequentially until the entire read original D1 is stored in the read original storing cell 104, the control portion 1250 controls the display portion 235a of the operation portion 253 to display "FINISHED READING" indicating that the reading operation is finished (S1509). After the display, the control portion 1250 controls the image forming portion 220 to start the image formation based on the read data stored in the internal memory 252.

Next, the resultant S1 with the formed images is conveyed to the storing path 403 by the switching operation of the switch member 404 and is stored in the resultant storing cell 122 serving as a storing cell of the storage container 102 by the delivery roller 226 (S1510). After that, when the resultant S1 is sequentially stored in the resultant storing cell 122 until the entire resultant S1 is stored, the control portion 1250 controls the display portion 235a of the operation portion 253 to display "FINISHED STORING" indicating that the resultant S1 has been stored (S1511). When the display is performed, the control portion 1250 applies the OFF signal to the actuator 601 so as to deactivate the actuator 601 (S1512). When the actuator 601 is deactivated, the engaging portion 102a of the storage container 102 is disengaged from the lever 602, whereby the retaining (lock) of the storage container 102 by the lock mechanism 600 is finished.

When the retaining (lock) of the lock mechanism 600 is finished, the storage container 102 can be detached from the original feeding apparatus 300 (S1513). After detaching the storage container 102, the user opens the first shutter 105 and takes out the read original D1 from the read original storing cell 104. The user further opens the second lid 120 of the resultant storing cell 122 and takes out the resultant S1.

The lock mechanism 600 is provided, and hence it is possible to prevent the user from detaching the storage container 102 from the original feeding apparatus 300 by mistake during the reading of the original or during the image formation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-149536, filed Jun. 6, 2008 and Japanese Patent Application No. 2009-077022, filed Mar. 26, 2009, which are hereby incorporated by reference herein in their entirety.

What is claimed is:

1. An image forming system comprising:
   an image reading portion which reads an image of an original;
   an image forming portion which forms the image on a sheet based on image information read by the image reading portion; and
   one storing device which stores the original before the image is read, the original after the image is read, and the sheet on which the image has been formed based on the image information,
   wherein the storing device is detachable from the image forming system.

2. An image forming system according to claim 1, further comprising a first attaching portion and a second attaching portion to which the storing device is attached, wherein:
   the original after the image is read is stored in the storing device in a state where the storing device is attached to the first attaching portion; and
   the sheet on which the image has been formed is stored in the storing device in a state where the storing device is attached to the second attaching portion.

3. An image forming system according to claim 2, further comprising:
   a detection portion which detects that the storing device is attached to the second attaching portion; and
   a control portion which controls an image forming operation of the image forming portion,
   wherein when a detection signal indicating that the storing device is attached to the second attaching portion is input from the detection portion, the control portion controls the image forming portion to start the image forming operation based on the image information.

4. An image forming system according to claim 3, further comprising:
   a first identifying portion which identifies the storing device attached to the first attaching portion; and
   a second identifying portion which identifies the storing device attached to the second attaching portion,
   wherein the control portion controls the image forming portion to perform the image forming operation when an identification result of the first identifying portion is the same as an identification result of the second identifying portion.

5. An image forming system according to claim 1, wherein the storing device is divided into a first original storing portion which stores the original before the image is read, a second original storing portion which stores the original after the image is read, and a sheet storing portion which stores the sheet on which the image has been formed.

6. An image forming system according to claim 1, wherein the original and the sheet stored in the storing device are covered with an opaque member.

7. An image forming system according to claim 1, further comprising:
   an original conveying portion which conveys the original;
   a sheet conveying portion which conveys the sheet on which the image is formed; and
   an attaching portion to which the storing device is attached, wherein:
   the original conveying portion conveys to the image reading portion the original stored in the storing device attached to the attaching portion, and conveys the original after the image is read so as to store in the storing device; and the sheet conveying portion conveys the sheet on which the image has been formed so as to store in the storing device attached to the attaching portion.

8. An image forming system according to claim 7, further comprising a detachment restricting portion which restricts detachment of the storing device attached to the image forming system.

9. An image forming system according to claim 8, wherein the detachment of the storing device is restricted by the detachment restricting portion while the image forming portion forms the image, and the detachment restricting portion releases the restricting of the detachment of the storing device after an image formation of the original stored in the storing device is finished.

10. An image forming system according to claim 9, further comprising a display portion which displays that the detachment of the storing device is restricted while the image forming portion forms the image.

11. An image forming system comprising:
   an image reading portion which reads an image from an original that is conveyed;
   an image forming portion which forms the image on a sheet based on image information read by the image reading portion;
   one storing device which stores the original after the image is read and the sheet on which the image has been formed based on the image information,
   wherein the storing device is detachable from the image forming system; and
   a detachment restricting portion which restricts detachment of the storing device attached to the image forming system.

12. An image forming system comprising:
   an image reading portion which reads an image from an original that is conveyed;
   an image forming portion which forms the image on a sheet based on image information read by the image reading portion;
   one storing device which stores the original before the image is read and the sheet on which the image has been formed based on the image information; and
   a first attaching portion and a second attaching portion to which the storing device is attached,
   wherein the storing device is detachable from the image forming system,
   the image reading portion reads the image of the original stored in the storing device in a state where the storing device is attached to the first attaching portion, and
   the sheet on which the image has been formed is stored in the storing device in a state where the storing device is attached to the second attaching portion.

13. An image forming system according to claim 12, further comprising:
   an original conveying portion which conveys the original;
   a sheet conveying portion which conveys the sheet on which the image is formed; and
   an attaching portion to which the storing device is attached,
   wherein the original conveying portion conveys to the image reading portion the original stored in the storing device attached to the attaching portion, and the sheet conveying portion conveys the sheet on which the image has been formed so as to store in the storing device attached to the attaching portion.

* * * * *